US010171570B2

(12) United States Patent
Kitano

(10) Patent No.: US 10,171,570 B2
(45) Date of Patent: Jan. 1, 2019

(54) INFORMATION PROCESSING APPARATUS

(71) Applicant: NEC Corporation, Minato-ku, Tokyo (JP)

(72) Inventor: Takatoshi Kitano, Tokyo (JP)

(73) Assignee: NEC CORPORATION, Tokyo (JP)

( * ) Notice: Subject to any disclaimer, the term of this patent is extended or adjusted under 35 U.S.C. 154(b) by 228 days.

(21) Appl. No.: 14/764,090

(22) PCT Filed: Dec. 16, 2013

(86) PCT No.: PCT/JP2013/007366
§ 371 (c)(1),
(2) Date: Jul. 28, 2015

(87) PCT Pub. No.: WO2014/125543
PCT Pub. Date: Aug. 21, 2014

(65) Prior Publication Data
US 2016/0014198 A1    Jan. 14, 2016

(30) Foreign Application Priority Data
Feb. 15, 2013    (JP) .................................. 2013-027312

(51) Int. Cl.
*H04L 29/08*    (2006.01)
*H04L 12/24*    (2006.01)
*G06F 11/16*    (2006.01)

(52) U.S. Cl.
CPC .......... *H04L 67/1008* (2013.01); *G06F 11/16* (2013.01); *H04L 41/5054* (2013.01)

(58) Field of Classification Search
CPC ......... H04L 29/08144; H04L 29/08171; H04L 29/06; H04L 29/08072; H04L 12/5695;
(Continued)

(56) References Cited

U.S. PATENT DOCUMENTS 6,421,687 B1 *    7/2002    Klosternnann ... G06F 17/30545
2005/0157697 A1 *    7/2005    Lee ........................ H04L 45/128
370/349
(Continued)

FOREIGN PATENT DOCUMENTS

JP    H09218858 A    8/1997
JP    2001508900 A    7/2001
(Continued)

OTHER PUBLICATIONS

International Search Report for PCT Application No. PCT/JP2013/007366, dated Mar. 18, 2014.
(Continued)

*Primary Examiner* — Mahran Y Abu Roumi

(57) ABSTRACT

An information processing apparatus includes data unit output controller configured to output, to a plurality of data unit processors, copied data units obtained by respectively copying a plurality of data units for a number that is set in advance, configured to respectively allocate output destinations of a plurality of identical copied data units to different data unit processors, configured to, for each combination of at least two data unit processors that is set in advance, obtain a number of the copied data unit groups in which the identical copied data units are respectively allocated to the data unit processors made into a combination, and configured to respectively allocate the output destinations of the plurality of copied data units to the data unit processors, so that the degree of variation of the number of copied data unit groups obtained for each combination of the data unit processors becomes smaller.

6 Claims, 20 Drawing Sheets

(58) Field of Classification Search
CPC ...... G06F 12/023; G06F 3/067; G06F 9/5016; G06F 3/0605; G06F 3/0631
USPC ........................................................ 709/226
See application file for complete search history.

(56) References Cited

U.S. PATENT DOCUMENTS

| | | | | |
|---|---|---|---|---|
| 2009/0327642 | A1* | 12/2009 | Ogihara ................ | G06F 11/008 711/170 |
| 2011/0262045 | A1* | 10/2011 | Ichikawa ............... | G03B 15/00 382/218 |
| 2012/0259983 | A1* | 10/2012 | Nakadai ................. | G06F 9/5083 709/226 |
| 2012/0310788 | A1* | 12/2012 | Naono .................... | G06Q 30/06 705/27.1 |
| 2013/0305003 | A1* | 11/2013 | Matsushita ............ | G06F 3/0608 711/162 |

FOREIGN PATENT DOCUMENTS

| | | |
|---|---|---|
| JP | 2012053777 A | 3/2012 |
| WO | 2008114441 A1 | 9/2008 |
| WO | 2011074699 A1 | 6/2011 |

OTHER PUBLICATIONS

English translation of Written opinion for PCT Application No. PCT/2013/007366.

* cited by examiner

Fig.2

| WORK UNIT ID | WORK UNIT NAME |
|---|---|
| 1 | WORK UNIT A |
| 2 | WORK UNIT B |
| ⋮ | ⋮ |

Fig.3

| DATA ID | DATA CONTENT |
|---|---|
| 1 | XXX |
| 2 | YYY |
| 3 | ZZZ |
| 4 | AAA |

Fig.4

| WORK UNIT ID \ DATA ID | 1 | 2 | 3 | 4 |
|---|---|---|---|---|
| 1 | ○ | ○ |  |  |
| 2 | ○ |  | ○ |  |
| 3 |  | ○ | ○ |  |

| WORK UNIT ID \ DATA ID | 1 | 2 | 3 | 4 |
|---|---|---|---|---|
| 1 | ○ | ○ |  | ○ |
| 2 | ○ |  | ○ | ○ |
| 3 |  | ○ | ○ |  |

|  | WU1 | WU2 | WU3 |
|---|---|---|---|
| WU1 |  | 2 | 1 |
| WU1 |  |  | 1 |
| WU1 |  |  |  |

Fig.7

| WORK UNIT ID \ DATA ID | 1 | 2 | 3 | 4 |
|---|---|---|---|---|
| 1 | ○ | ○ |  | ○ |
| 2 | ○ |  | ○ | ○ |
| 3 |  | ○ | ○ |  |

Fig.8

| WORK UNIT ID \ DATA ID | 1 | 2 | 3 | 4 |
|---|---|---|---|---|
| 1 | ○ |  | ○ |  |
| 2 | ○ |  | ○ |  |
| 3 |  | ○ |  | ○ |
| 4 |  | ○ |  | ○ |

Fig.9

| COMBINATION OF WORK UNIT MODULES | MIRROR TABLE VALUE |
|---|---|
| WU1−WU2 | 2 |
| WU1−WU3 | 0 |
| WU1−WU4 | 0 |
| WU2−WU3 | 0 |
| WU2−WU4 | 0 |
| WU3−WU4 | 2 |
| STANDARD DEVIATION | 0.94 |

Fig.10

| WORK UNIT ID \ DATA ID | 1 | 2 | 3 | 4 |
|---|---|---|---|---|
| 1 | ○ |  |  | ○ |
| 2 | ○ | ○ |  |  |
| 3 |  | ○ | ○ |  |
| 4 |  |  | ○ | ○ |

Fig.11

| COMBINATION OF WORK UNIT MODULES | MIRROR TABLE VALUE |
|---|---|
| WU1—WU2 | 1 |
| WU1—WU3 | 0 |
| WU1—WU4 | 1 |
| WU2—WU3 | 1 |
| WU2—WU4 | 0 |
| WU3—WU4 | 1 |
| STANDARD DEVIATION | 0.47 |

| WORK UNIT ID \ DATA ID | 1 | 2 | 3 |
|---|---|---|---|
| 1 | ○ | ○ | |
| 2 | ○ | ○ | |

B

| WORK UNIT ID \ DATA ID | 1 | 2 | 3 |
|---|---|---|---|
| 1 | ○ | ○ | |
| 2 | | ○ | ○ |

Fig.13

| JOB ID | JOB CONTENT | JOB RESULT | JOB STATUS |
|---|---|---|---|
| 1 | AAA | | WAITING |

Fig.14

| TASK ID | JOB ID | DATA ID | WORK UNIT ID | TASK RESULT | TASK STATUS |
|---|---|---|---|---|---|
| 1 | 1 | 1 | | | WAITING |
| 2 | 1 | 2 | | | WAITING |
| 3 | 1 | 3 | | | WAITING |
| 4 | 1 | 4 | | | WAITING |

| DATA ID | DATA CONTENT |
|---|---|
| 1 | XXX |
| 2 | YYY |
| 4 | AAA |

B

| DATA ID | DATA CONTENT |
|---|---|
| 1 | XXX |
| 3 | ZZZ |
| 4 | AAA |

C

| DATA ID | DATA CONTENT |
|---|---|
| 2 | YYY |
| 3 | ZZZ |

Fig.16

| TASK ID | JOB ID | DATA ID | WORK UNIT ID | TASK RESULT | TASK STATUS |
|---|---|---|---|---|---|
| 1 | 1 | 1 |  |  | WAITING |
| 2 | 1 | 2 | 3 |  | EXECUTION |
| 3 | 1 | 3 | 3 |  | EXECUTION |
| 4 | 1 | 4 |  |  | WAITING |

Fig.17

| TASK ID | JOB ID | DATA ID | WORK UNIT ID | TASK RESULT | TASK STATUS |
|---|---|---|---|---|---|
| 1 | 1 | 1 | 1 |  | EXECUTION |
| 2 | 1 | 2 | 3 |  | EXECUTION |
| 3 | 1 | 3 | 3 |  | EXECUTION |
| 4 | 1 | 4 | 1 |  | EXECUTION |

Fig.18

| TASK ID | JOB ID | DATA ID | WORK UNIT ID | TASK RESULT | TASK STATUS |
|---|---|---|---|---|---|
| 1 | 1 | 1 | 1 | 0 | COMPLETED |
| 2 | 1 | 2 | 3 | 0 | COMPLETED |
| 3 | 1 | 3 | 3 | 0 | COMPLETED |
| 4 | 1 | 4 | 1 | 3 | COMPLETED |

Fig.19

| JOB ID | JOB CONTENT | JOB RESULT | JOB STATUS |
|---|---|---|---|
| 1 | AAA |  | COMPLETED |

INFORMATION PROCESSING APPARATUS

This application is a National Stage Entry of PCT/JP2013/007366 filed on Dec. 16, 2013, which claims priority from Japanese Patent Application 2013-027312 filed on Feb. 15, 2013, the contents of all of which are incorporated herein by reference, in their entirety.

TECHNICAL FIELD

The present invention relates to an information processing apparatus, and more particularly, to an information processing apparatus for performing distributed parallel processing on predetermined data.

BACKGROUND ART

A technique of a distributed processing system has been known, in which large-scale data are divided into multiple data units in a case where large-scale data are processed, and multiple work units respectively perform processing on the divided multiple data units.

For example, first, a distributed processing system divides, into data units, a processing request (job) which is given by the client and which is targeted on all or some of data unit groups divided large-scale data. Subsequently, the distributed processing system generates a processing request (task) of a data unit for a work unit performing predetermined processing on each of the divided data units. Subsequently, in the divided processing system, each of multiple work units performs predetermined processing on the data unit in accordance with this processing request, and outputs a processing result. Then, the distributed processing system collects the processing results of the task, thus performing processing on the data units for the entire or a part of the large-scale data.

In the technique of such distributed processing system, it is desired to have a distributed processing system of large-scale data having a high degree of reliability capable of returning a processing result even in a case where a failure and the like occurs in a small number of work units (for example, physical servers), and the work units goes down. In the technique of the distributed processing system, many work units are required, and therefore, it is desired to reduce the overhead due to the tasks by reducing the amount of communication and the number of times communication is performed between the work unit and the controller for commanding the work unit to perform the processing.

In this case, in the distributed processing system, a technique for distributing the processing load to multiple work units is known (for example, see PTL 1). In the technique of PTL 1, in a case where an access request is given to multiple processors to access various kinds of data arranged in a distributed manner, a distributed-type data base management system in which processing according to the access request is performed by a particular processor arranged with desired data includes a processing load deviation detector and a data arrangement change unit. Then, this processing load deviation detector detects the processing load deviation on the basis of the system load statistics information and the access information for accessing the data unit, and changes the arrangement configuration of the data in accordance with the load deviation. As a result, the load of the task can be distributed.

In the technique of the distributed processing system, a redundant arrangement technique of data for arranging the same data unit in a distributed manner to each of the multiple work units so as not to lose the data unit is known (for example, see PTL 2). The technique of PTL 2 includes means for classifying the physical node of the storage into groups, and means for allocating data so that distributed data and copied data of the distributed data do not exist in the group. The distributed processing system having such configuration arranges copied data to multiple different groups, thus capable of maintaining redundancy of the data.

CITATION LIST

Patent Document

PTL 1: Japanese Patent Laid-Open No. H9-218858
PTL 2: International Publication No. 2008/114441

SUMMARY OF INVENTION

Technical Problem

However, in the above redundant arrangement technique, the data units are arranged in a distributed manner only in view of the redundancy, and therefore, in a case where each of multiple work units performs processing on the data unit, it takes a long time to complete all the processing.

For example, in a case where each of the two work units includes many identical data units, and a failure and the like occurs in one of the work units, one of the work units does not perform processing on the data unit, and instead, the other of the work units performs processing on the data unit. Therefore, the number of data units processed by the other of the work units increases. Other work units that do not hold the same data unit as the data unit held by the one of the work units in which a failure and the like occurs cannot perform processing on the data unit instead of the one of the work units. As a result, the number of work units performing processing at a time decreases in the entire distributed processing system, and therefore, there is a problem in that it takes a long time to complete the processing on all of the data units, and the throughput decreases.

Therefore, it is an object of the present invention to provide an information processing apparatus capable of solving the problem of the reduction of the throughput which is the problem explained above.

Solution to Problem

An information processing apparatus according to an aspect of the present invention for solving the above object, includes, data unit output controller configured to output, to a plurality of data unit processors, copied data units obtained by respectively copying a plurality of data units for a number that is set in advance, configured to respectively allocate output destinations of a plurality of identical copied data units to different data unit processors, configured to, for each combination of at least two data unit processors that is set in advance, obtain a number of the copied data unit groups in which the identical copied data units are respectively allocated to the data unit processors made into a combination, and configured to respectively allocate the output destinations of the plurality of copied data units to the data unit processors, so that the degree of variation of the number of copied data unit groups obtained for each combination of the data unit processors becomes smaller.

An information processing method according to another aspect of the present invention, includes, while outputting, to a plurality of data unit processors, copied data units obtained by respectively copying a plurality of data units for a number that is set in advance, allocating output destinations of a plurality of identical copied data units to different data unit processors, for each combination of at least two data unit processors that is set in advance, obtaining a number of the copied data unit groups in which the identical copied data units are respectively allocated to the data unit processors made into a combination, and respectively allocating the output destinations of the plurality of copied data units to the data unit processors, so that the degree of variation of the number of copied data unit groups obtained for each combination of the data unit processors becomes smaller.

A program, according to another aspect of the present invention, for causing an information processing apparatus to realize data unit output control means for outputting, to a plurality of data unit processors, copied data units obtained by respectively copying a plurality of data units for a number that is set in advance, wherein the data unit output control means respectively allocates output destinations of a plurality of identical copied data units to different data unit processors, and for each combination of at least two data unit processors that is set in advance, the data unit output control means obtains a number of the copied data unit groups in which the identical copied data units are respectively allocated to the data unit processors made into a combination, and the data unit output control means respectively allocates the output destinations of the plurality of copied data units to the data unit processors, so that the degree of variation of the number of copied data unit groups obtained for each combination of the data unit processors becomes smaller.

Advantageous Effects of Invention

The present invention is configured as described above, and can improve the throughput of the processing performed on the data unit.

BRIEF DESCRIPTION OF DRAWINGS

FIG. 2 is a figure for explaining an example of a work unit storage.

FIG. 3 is a figure for explaining an example of a master data storage.

FIG. 4 is a figure for explaining allocation of data units.

FIG. 5 is a figure for explaining allocation of data units.

FIG. 6 is a figure for explaining a mirror table value.

FIG. 7 is a figure for explaining an example of a data arrangement storage.

FIG. 8 is a figure illustrating an example of a data arrangement matrix.

FIG. 9 is a figure illustrating an example of a standard deviation of a mirror table value.

FIG. 10 is a figure illustrating an example of a data arrangement matrix.

FIG. 11 is a figure illustrating an example of a standard deviation of a mirror table value.

FIG. 12 is a figure for explaining an example of a total summation of a mirror table value.

FIG. 13 is a figure for explaining an example of a job storage.

FIG. 14 is a figure for explaining an example of a task storage.

FIG. 15 is a figure for explaining an example of a copied data storage.

FIG. 16 is a figure for explaining an example of a task storage.

FIG. 17 is a figure for explaining an example of a task storage.

FIG. 18 is a figure for explaining an example of a task storage.

FIG. 19 is a figure for explaining an example of a job storage.

DESCRIPTION OF EMBODIMENTS

Hereinafter, an exemplary embodiment of a distributed processing system according to the present invention will be explained with reference to FIGS. 1 to 28. FIGS. 1 to 21 are figures for explaining a configuration of a distributed processing system. FIGS. 22 to 28 are a figure for explaining an operation of the distributed processing system.

First Exemplary Embodiment (Configuration)

Figure 1:
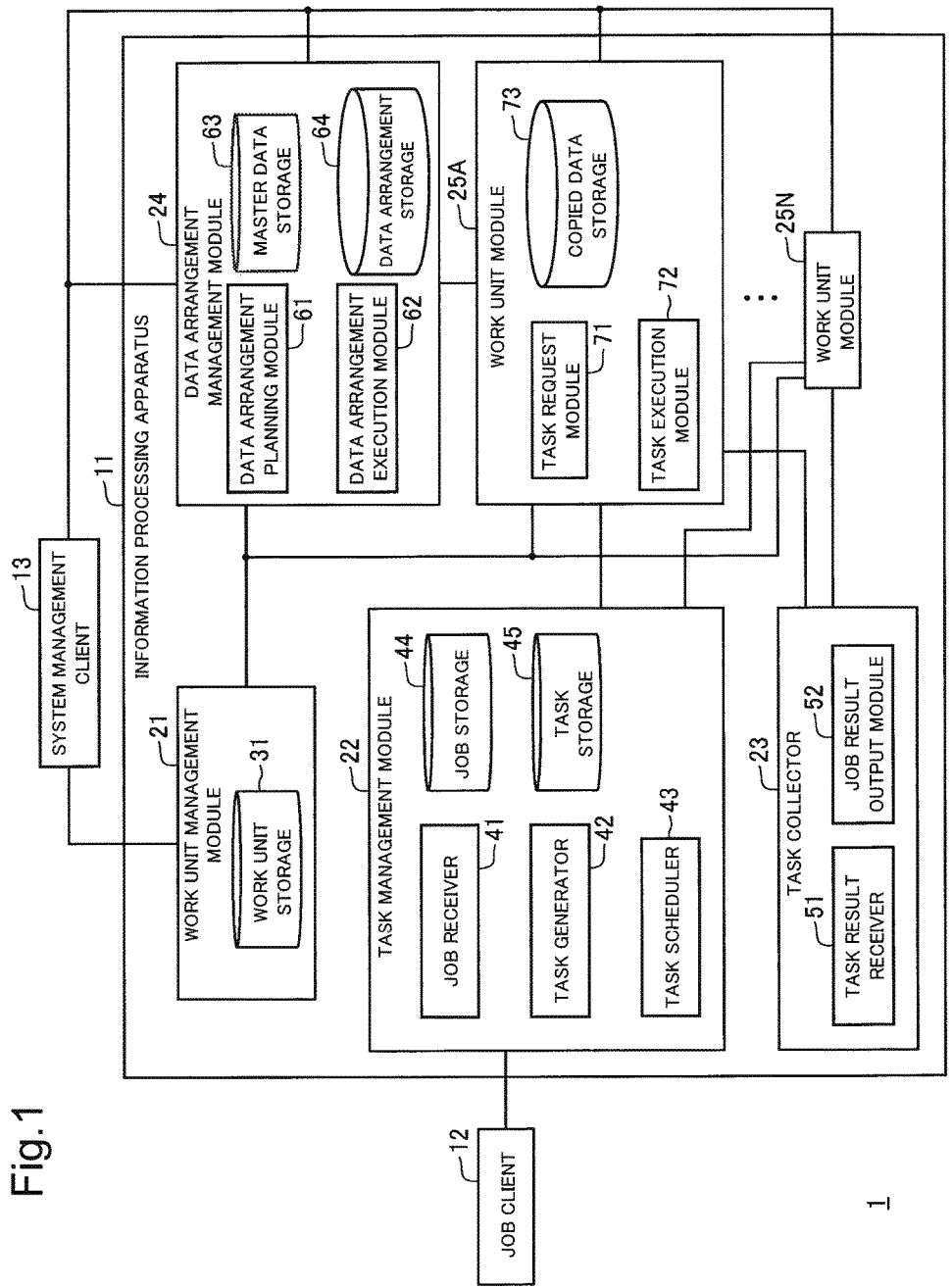
FIG. 1 is a figure representing a configuration of a distributed processing system according to a first exemplary embodiment of the present invention.

As shown in FIG. 1, a distributed processing system 1 according to a first exemplary embodiment of the present invention includes an information processing apparatus 11, a job client 12, and a system management client 13. The job client 12 feeds a job (processing request) which is to be executed by the information processing apparatus 11. The system management client 13 manages each of multiple work units (work unit modules 25 explained later) executing a task (divided processing request) generated on the basis of a job. Then, the information processing apparatus 11 generates multiple tasks on the basis of the job fed from the job client 12, and causes the multiple work units to execute the generated multiple tasks. For example, the job client 12 outputs any given character string, as the content of the fed job. Then, the information processing apparatus 11 compares any given character string, which is output from the job client 12, and the character string stored in advance, and executes processing for outputting the number of matching characters.

First, the configuration of the information processing apparatus 11 will be explained. The information processing apparatus 11 includes a work unit management module 21, a task management module 22, a task collector 23, a data arrangement management module 24, multiple work unit modules 25A to 25N (hereinafter described as work unit modules 25 when each of the multiple work unit modules 25A to 25N are not distinguished from each other). For example, the function parts constituting the information processing apparatus 11 are arranged on different physical server. In this case, each function part constituting the information processing apparatus 11 includes a central processing unit (CPU), a RAM (Random Access Memory), storage, and a network interface card (NIC), and can operate with a control of the operating system (OS). Then, each server constituting the work unit management module 21, the task management module 22, the task collector 23, the data arrangement management module 24, and multiple work unit modules 25 can be connected with each other via a network and the like (for example, TCP (Transmission Control Protocol)/IP (Internet Protocol)).

Each of data unit allocation processing, job registration processing, and job execution processing in the distributed processing system 1 will be hereinafter explained in order. The data unit is divided predetermined data (for example, large-scale data) into multiple pieces. The data unit allocation processing is processing for respectively allocating data units to multiple work unit modules 25 (data unit processors). The job registration processing is processing for generating a task divided the job fed from the job client 12 in association with the data units. Then, in the job execution processing, the work unit module 25 executes predetermined processing on the allocated data unit on the basis of the task.

It should be noted that the data unit allocation processing is performed once at the first and the job registration processing and the job execution processing are executed repeatedly. When the configuration of the distributed processing system 1 is changed, e.g., there is a change in the number of work unit modules 25 to which the data units are allocated, the data unit allocation processing is performed again.

Explained below is a case where the number of work unit modules 25 (the number of work units) w is three, the number of data units d is four, and a redundancy degree number r of data unit is two. It is to be understood that the number of work units w, the number of data units d, and the redundancy degree number r are not limited thereto, and each of them may be an integer equal to or more than two. The redundancy degree number r is a value that does not change for each data unit. The identical multiple copied data units that obtained by copying a data unit are respectively arranged in (allocated to) multiple different work unit modules 25. At this occasion, in the case where the number of work units w is less than the redundancy degree number r holds, the degree of redundancy cannot be satisfied, and therefore, 1<r≤w holds.

It is also an object of the present exemplary embodiment to be able to perform load balancing with a less number of work units. Therefore, each work unit module 25 is preferably arranged with one or more data units, and the following expression holds: the number of work units w≤the number of data units d*redundancy degree number r. The data ID (Identification) and the data content are registered to the master data storage 63 so that this condition is satisfied. The work unit ID and the work unit name are recorded to the work unit storage 31.

First, the data unit allocation processing for allocating (arranging) multiple data units to (in) multiple work unit modules 25 (data unit processors) will be explained. In this case, first, the configuration of the work unit management module 21 will be explained. As shown in FIG. 2, the work unit management module 21 is provided with the work unit storage 31 for storing a unique work unit ID given in advance to each work unit module 25 and a work unit module 25 (for example, work unit name) in such a manner that the work unit ID and the work unit module 25 are associated with each other. For example, the work unit storage 31 stores three work unit modules 25 (for example, work unit names) associated with the work unit IDs "1" to "3", respectively.

Subsequently, the configuration of the data arrangement management module 24 (data unit output control means) will be explained. The data arrangement management module 24 includes a data arrangement planning module 61, a data arrangement execution module 62, a master data storage 63, and a data arrangement storage 64.

The master data storage 63 stores a unique data ID that is set in advance to each data unit and a data content of a data unit indicated by the data ID in such a manner that the data ID and the data content of the data unit are associated with each other (for example, FIG. 3). For example, in the distributed processing system 1, the system management client 13 outputs the data ID and the data content to the data arrangement management module 24 before the job client 12 feeds the job to the information processing apparatus 11. Then, the data arrangement management module 24 stores the obtained data ID and the data content to the master data storage 63. It should be noted that the data content may be any content as long as it is a data content with which the task execution module 72 of the work unit module 25 explained later can perform processing.

The data arrangement planning module 61 allocates multiple data units to multiple work unit modules 25 (makes a plan of arrangement) on the basis of information about multiple work unit modules 25 stored in the work unit storage 31, information about multiple data units stored in the master data storage 63, and the redundancy degree number r of the data unit that is set in advance. Then, the data arrangement planning module 61 outputs the data units (copied data units), which are obtained by copying each of multiple data units for the number of times that is set in advance (redundancy degree number r), to multiple work unit modules 25.

More specifically, the data arrangement planning module 61 respectively allocates multiple data units to multiple work unit modules 25 s that the following four conditions are satisfied. More specifically, first, the data arrangement planning module 61 (A) allocates copies of the data unit corresponding to the identical data ID (the identical multiple copied data units) to different work unit modules 25. Then, the data arrangement planning module 61 (B) causes the number of data units corresponding to each data ID (the redundancy degree number r of the data unit) to be the same. Further, the data arrangement planning module 61 (C) selects a combination in which the standard deviation of the number of data units allocated to each work unit module 25 (the number of copied data units) is minimized (the degree of dispersion decreases). Then, further, the data arrangement planning module 61 (D) selects an arrangement pattern in which the number of data units corresponding to the identical data ID allocated to at least two different work unit modules 25 in the selected combination (mirror table value, the number of copied data unit groups) is minimized and in which the total summation value (total summation) of the mirror table values of the combination of the work unit modules 25 is minimized. Then, in a case where there are multiple data arrangement patterns satisfying these conditions, the data arrangement planning module 61 selects any given arrangement pattern. It should be noted that the conditions (A) and (B) are required to be satisfied, but the order of (C) and (D) may be the opposite. It may also be possible to satisfy one of the conditions (C) and (D) (in particular, condition (D)).

Hereinafter, the data unit allocation processing of the data arrangement planning module 61 will be explained in a more specific manner. First, the data arrangement planning module 61 generates, for example, a data arrangement matrix (data unit output table) in which the work unit ID is the vertical axis and the data ID is the horizontal axis. Then, the data arrangement planning module 61 divides the area of the generated data arrangement matrix into an ideal data arrangeable areas and an ideal data non-arrangeable area.

More specifically, the data arrangement planning module 61 divides, in the ascending order of the data ID, the area of the data ID column of the data arrangement matrix into areas as many as the number of combinations (wCr) of the number of work units w and the redundancy degree number r of data units. In this case, in the area of the data arrangement matrix, an area where the number of columns of the divided area is wCr is adopted as an the ideal data arrangeable area, an area where the number of columns of the divided area is a value less than wCr is adopted as an ideal data non-arrangeable area.

For example, in a case where the number of work units w is three, and the redundancy degree number r of data units is two, the number of combinations of the number of work units w and the redundancy degree number r is 3C2=3. For this reason, as shown in FIG. 4, the data arrangement planning module 61 divides the area of the columns of the data IDs "1" to "3" as an ideal data arrangeable area 101, and as shown in FIG. 5, the data arrangement planning module 61 divides the area of the column of the data ID "4" as an ideal data non-arrangeable area 102. For example, as described above, in a case where the number of work units w is three, the number of data units d is three, and the redundancy degree number r is 2, then, the combination wCr of the work unit ID and the data ID is three, and the number of data units d is also 3, and therefore, the number of ideal data arrangeable areas is one (a quotient divided wCr by d).

Subsequently, the data arrangement planning module 61 plans an arrangement of multiple data units for the ideal data arrangeable areas 101 thus divided (performs allocation of data units). More specifically, first, the data arrangement planning module 61 calculates a combination for selecting the work units ID as many as the redundancy degree number r of data units that is set in advance (data arrangement pattern) from all the work unit IDs. For example, in a case where two work unit IDs (which is as many as the redundancy degree number r) are selected from the three work unit IDs "1" to "3", the combination thereof is three combinations including (1, 2), (1, 3), (2, 3).

Then, the data arrangement planning module 61 uniformly allocates the calculated data arrangement pattern to the ideal data arrangeable area (for example, see FIG. 4). When this condition is satisfied, the combination of the work unit IDs may be arranged in the columns of any data IDs within the ideal data arrangeable area. When there are multiple data arrangement patterns for the ideal data arrangeable area 101, the data arrangement planning module 61 chooses any one of multiple data arrangement patterns.

For example, the data arrangement planning module 61 allocates a combination (1, 2) of work unit IDs to the column of the data ID "1" as shown in FIG. 4. The data arrangement planning module 61 allocates a combination (1, 3) of the work unit IDs to the column of the data ID "2". Further, the data arrangement planning module 61 allocates a combination (2, 3) of work unit IDs to the column of the data ID "3". As described above, the data arrangement planning module 61 selects (calculates) the data arrangement pattern in which the combination of the work unit IDs is allocated to the columns of the data IDs.

Subsequently, the data arrangement planning module 61 arranges the data units to the ideal data non-arrangeable area 102 so as to satisfy the redundancy degree number r. More specifically, the data arrangement planning module 61 calculates a data arrangement pattern for allocating the combination wCr of the work unit IDs for selecting r work unit IDs from among w work unit IDs for the ideal data non-arrangeable area 102. In the example of FIG. 5, the data arrangement planning module 61 calculates, as a data arrangement pattern, a combination of work unit IDs (1, 2), (2, 3), (1, 3) arranged in the column of the data ID "4".

Subsequently, the data arrangement planning module 61 calculates a data arrangement pattern satisfying the condition (C) explained above. More specifically, the data arrangement planning module 61 calculates a data arrangement pattern, in which the standard deviation of the number of data units allocated to each work unit ID is minimized, from the data arrangement pattern calculated for each of the ideal data arrangeable area 101 and the ideal data non-arrangeable area 102. In the above example, all of the standard deviations of the numbers of data units allocated to the work unit ID calculated for each of the calculated data arrangement patterns (a combination of the work unit IDs (1, 2), (2, 3), (1, 3)) become the same. Therefore, the data arrangement planning module 61 calculates the combination of the work unit IDs (1, 2), (2, 3), (1, 3) as the data arrangement pattern for the ideal data non-arrangeable area 102.

Subsequently, the data arrangement planning module 61 calculates a data arrangement pattern satisfying the above condition (D). More specifically, the data arrangement planning module 61 selects a data arrangement pattern, in which the standard deviation of the mirror table values is minimized, from among the calculated data arrangement pattern. The mirror table value indicates the number of data units of the identical data ID in which the data units of the identical data ID are allocated to at least two work unit modules 25 that are set in advance (the number of the identical copied data unit groups). The data arrangement planning module 61 calculates (obtains) the mirror table value for each combination of the calculated work IDs, and selects a data arrangement pattern in which the standard deviation of the mirror table values is minimized and the total summation value of the mirror table values of the work units is minimized. It should be noted that the data arrangement planning module 61 may select a data arrangement pattern in which at least the standard deviation of the mirror table values is minimized.

FIG. 5 is a figure illustrating an example in which a combination (1, 2) of the work unit IDs is selected as the data arrangement pattern of the ideal data non-arrangeable area 102 (the column of the data ID "4"). Then, for example, the data arrangement planning module 61 calculates the mirror table value for each combination of the work unit IDs for the data arrangement pattern of FIG. 5. More specifically, the data arrangement planning module 61 calculates "2" as the mirror table value for the combination (1, 2) of the work unit IDs as shown in FIG. 6. The data arrangement planning module 61 calculates "1" as the mirror table value for the combination (2, 3) of the work unit IDs. The data arrangement planning module 61 calculates "1" as the mirror table value for the combination (1, 3) of the work unit IDs. In the above example, all of the standard deviations of the mirror table values for the combination of the work unit IDs calculated for the data arrangement patterns thus calculated (the combination of the work unit IDs (1, 2), (2, 3), (1, 3)) are the same. Therefore, for example, the data arrangement planning module 61 selects the combination of the work unit IDs (1, 2), (2, 3), (1, 3) as the data arrangement pattern for the ideal data non-arrangeable area 102.

In a case where there are multiple data arrangement patterns for the ideal data non-arrangeable area 102 satisfying the above conditions (C) and (D), the data arrangement planning module 61 selects any one of the multiple data arrangement patterns as the data arrangement pattern of the ideal data non-arrangeable area 102. For example, the data arrangement planning module 61 selects a data arrangement pattern in which the combination of the work unit IDs becomes (1, 2) for the column of the data ID "4". Accordingly, the data arrangement planning module 61 can respectively determine a data arrangement pattern for allocating multiple data units to multiple work unit modules 25.

Then, the data arrangement planning module 61 stores the generated data arrangement matrix to the data arrangement storage 64. FIG. 7 is an example of data arrangement matrix in which the number of work units is three and the number of data is four. In the example of FIG. 7, the "0" indicates that the copied data unit corresponding to the data ID is allocated to the work unit module 25 corresponding to the work unit ID (already arranged). In the example of FIG. 7, a vacant field means that any copied data unit is not arranged in the work unit module 25.

In this case, a data arrangement pattern will be explained in a case where the above conditions (A) to (C) are satisfied but the condition (D) is not satisfied. FIG. 8 is an example of a data arrangement matrix in which the redundancy degree number r of data units is the same as the number of data units allocated to each work unit, but the standard deviation value of the mirror table values is more than that of the data arrangement matrix of FIG. 7. The data arrangement planning module 61 calculates the mirror table value for each combination of the work unit IDs in the data arrangement pattern of the data arrangement matrix of FIG. 8, and calculates the standard deviation. FIG. 9 is a figure illustrating the mirror table values and the standard deviations calculated for the data arrangement pattern of the data arrangement matrix of FIG. 8. As shown in FIG. 9, the standard deviation of the mirror table value in (the data arrangement pattern of) the data arrangement matrix of FIG. 8 is 0.94.

On the other hand, a data arrangement pattern satisfying not only the above conditions (A) to (C) but also the condition (D) is a data arrangement matrix of FIG. 10. The data arrangement planning module 61 calculates the mirror table value and the standard deviation for the data arrangement pattern of the data arrangement matrix of FIG. 10. The calculation result of the mirror table value and the standard deviation will be shown in FIG. 11. As shown in FIG. 11, the standard deviation value of the mirror table values in the data arrangement matrix of FIG. 10. The standard deviation value of the mirror table values in the data arrangement matrix of FIG. 10 is 0.47.

A data arrangement pattern in a case where the condition (D) is not satisfied will be explained with reference to FIG. 12A. FIG. 12A is an example of a data arrangement matrix in which the total summation of the mirror table values becomes larger. As shown in FIG. 12A, the data units of the data IDs "1", "2" are allocated to the work unit modules 25 of the work unit IDs "1", "2", respectively. In this case, the data arrangement planning module 61 calculates "2" as the (total summation of) the mirror table values, and calculates "0" as the standard deviation.

On the other hand, the data arrangement pattern satisfying the condition (D) is a data arrangement matrix of FIG. 12B. In the example of FIG. 12B, the data arrangement planning module 61 calculates "1" as the (total summation of) the mirror table values, and calculates "0" as the standard deviation. As described above, even when the standard deviation of the mirror table values is the same value, the total summation value (total summation) of the mirror table values may be different. In such case, the data arrangement planning module 61 selects a data arrangement pattern in which the total summation of the mirror table values is minimized.

As described above, a data arrangement pattern is selected (calculated) so that the standard deviation (the degree of variation) of the mirror table values becomes smaller, and the total summation value of the mirror table values of the combination of the work unit modules 25 is minimized. As a result, redundant data units are not concentrated on a single work unit module 25, and are allocated in a distributed manner. Therefore, even when a failure and the like occurs in any given work unit module 25, the work unit module 25 holding the same data unit as the data unit held by the work unit module 25 in which a failure and the like occurs can perform processing on the data unit on behalf of the work unit module 25 in which the failure and the like occurs. As a result, the task on all the data units can be done quickly, and the throughput can be improved.

Finally, the data arrangement execution module 62 respectively outputs multiple data units to multiple work unit modules 25 on the basis of the data arrangement matrix stored in the data arrangement storage 64. More specifically, the data arrangement execution module 62 obtains, on the basis of the data arrangement matrix, a data arrangement list including a combination of the data ID and the work unit ID in which the copied data unit has already been arranged is obtained. Then, the data arrangement execution module 62 obtains the data content from the master data storage 63 using the data ID as the key, and outputs the data ID and the data content corresponding to the data ID to the copied data storage 73 of the work unit module 25 corresponding to the work unit ID. Therefore, the copied data unit is stored to the copied data storage 73, and multiple copied data units can be respectively arranged in multiple work unit modules 25.

Subsequently, job registration processing for executing a job will be explained. First, a configuration of the task management module 22 will be explained. The task management module 22 (processing request control means) includes a job receiver 41, a task generator 42, a task scheduler 43, a job storage 44, and a task storage 45.

The job receiver 41 receives a job from the job client 12, and stores the received job to the job storage 44. For example, when the job receiver 41 receives a job from the job client 12, the job receiver 41 issues a job ID unique to each job. As shown in FIG. 13, the job receiver 41 stores, to the job storage 44, the job ID, the job content that is fed by the job client 12, and a job state "waiting" indicating that the job is received, in such a manner that the job ID, the job content, and the job state "waiting" are associated with each other. The job state is changed to "execution" when a task related to the job is output by the task scheduler 43, and the job state is changed to "completed" when all the tasks related to the job is completed. When the job receiver 41 receives a job, a request is given to the task generator 42 to divide the job into tasks.

The task generator 42 generates tasks corresponding to data units divided the job received by the job receiver 41 in accordance with the number of data units stored in the master data storage 63, and stores each of the generated tasks to the task storage 45. Then, as shown in FIG. 14, the task generator 42 stores, to the task storage 45, the task ID for identifying the task, the job ID which is the origin of the task, the data ID of the data unit serving as the target of the task, and the task state "waiting" which is the state in which the task is registered, in such a manner that the job ID, the data ID, and the task state "waiting" are associated with each other. The task state becomes "waiting" when the task generator 42 generates a task and stores the task to the task storage 45. The task state becomes "execution" when the task scheduler 43 outputs the task to the work unit module 25. Then the task state becomes "completed" when the work unit module 25 processes a task result, outputs the task result to the task collector 23, and the task collector 23 stores the task result to the task storage 45. As described above, the task generator 42 generates tasks divided the job in association with multiple data units, and registers (stores) the task to the task storage 45.

Finally, the job execution processing will be explained. In this example, suppose that the data units are respectively allocated to the three work unit modules 25 on the basis of the data arrangement matrix of FIG. 7. More specifically, copies of the data units of the data IDs "1", "2", "4" (copied data units) are considered to be arranged in the work unit module 25 of the work unit ID "1" (the copied data storage 73). The copies of the data units of the data IDs "1", "3", "4" are considered to be arranged in the work unit module 25 of the work unit ID "2". The copies of the data units of the data IDs "2", "3" are considered to be arranged in the work unit module 25 of the work unit ID "3" (for example, see FIGS. 15A to 15C).

In this case, the work unit module 25 executing the task based on the job will be explained. The work unit module 25 includes a task request module 71, a task execution module 72, and a copied data storage 73. In a case where there is no task to be executed or there are a small number of tasks to be executed, the task request module 71 outputs all of the work unit IDs, which are unique in the entire distributed processing system 1, and the data IDs, which are stored in the copied data storage 73 (identification information for identifying the data unit), to the task scheduler 43 as a task request. For example, the work unit module 25 of the work unit ID "3" generates a list indicating the data IDs "2", "3" stored in the copied data storage 73 of the work unit ID "3", and outputs a task request including the list and the work unit ID "3" of itself, which are associated with each other, to the task scheduler 43.

Then, the task scheduler 43 obtains, from the task storage 45, a task for the task request which is output from the work unit module 25, and outputs the obtained task to the work unit module 25 which has output the task request. For example, the task scheduler 43 receives the work unit ID "3", which is output from the work unit module 25 of the work unit ID "3", and the list, which indicates the data IDs "2", "3" stored by the work unit module 25 stored by itself. Subsequently, the task scheduler 43 searches, from the task storage 45, a task ID of which state is "waiting" and which matches the data ID included in the received list, and obtains all or some of the matching job IDs. In order to obtain the job ID, the task scheduler 43 may obtain a single job ID or may obtain all of the job IDs in a case where there are multiple job IDs. For example, the task scheduler 43 searches the task IDs "2", "3" matching the data IDs "2", "3", and obtains information about the tasks respectively corresponding to the task IDs "2", "3".

Then, the task scheduler 43 associates each the task IDs "2", "3" with the work unit ID "3" requesting the task, and registers the task IDs "2", "3", and registers "execution" as the task state (for example, see FIG. 16). Subsequently, the task scheduler 43 obtains the job content corresponding to the obtained job ID (for example, the job ID "1"). Finally, the task scheduler 43 makes a response of a single task request (task information) including the task ID, the job ID, the data ID, and the content of the job, and outputs the response to the work unit module 25. For example, the task scheduler 43 outputs the task information corresponding to the data IDs "2", "3" to the work unit module 25 of the work unit ID "3".

In a case where the task request module 71 of the work unit module 25 receives the response of the task request (task information) from the task scheduler 43, the task request module 71 outputs the task information to the task execution module 72. Then, the task execution module 72 executes the task (predetermined processing performed on the data unit) on the basis of the content of the job included in the task information. A single task is associated with a particular data unit. Therefore, the task execution module 72 obtains the copied data unit, which is the target of the task, from the copied data storage 73 by using the data ID included in the task information as the key. Subsequently, the task execution module 72 executes the task on the basis of the job content and the data content of the copied data unit stored in the copied data storage 73. The content to be executed may be any processing performed with the job content and the data content. The task execution module 72 may execute the task group associated with a single job ID in parallel, or may execute the task group in a serial manner (one by one).

For example, as shown in FIGS. 15A to 15C, the data content of the data ID "2" is "YYY", and the data content of the data ID "3" is "ZZZ", and as shown in FIG. 13, the job content of the job ID "1" is "AAA". Therefore, in a case where the processing of the task is processing for counting the number of matching characters in the job content and the data content, the task execution module 72 outputs "0" as the task processing result of the task ID "2", and outputs "0" as the task processing result of the task ID "3".

Then, in a case where execution of some or all the task groups included in the task information have been completed, the task execution module 72 outputs a list of execution results of the task including the task ID, the job ID associated with the task ID, and the task result serving as the processing result of the task, to the task result receiver 51 as the task execution result group. The task execution module 72 requests the task request module 71 to obtain a new task.

A case will be hereinafter explained in which the work unit module 25 of the work unit ID "3" outputs the task request and thereafter the work unit module 25 of the work unit ID "1" outputs the task request. For example, the work unit module 25 of the work unit ID "1" generates a list indicating the data IDs "1", "2", "4" stored in the copied data storage 73 of the work unit ID "1". Then, the work unit module 25 of the work unit ID "1" outputs a task request in which the list and the work unit ID "1" are associated with each other to the task scheduler 43.

Subsequently, the task scheduler 43 receives the work unit ID "1", which is output from the work unit module 25 of the work unit ID "1", and the list indicating the data IDs "1", "2", "4" stored in the work unit module 25 of the work unit ID "1". Then, the task scheduler 43 searches the task IDs "1", "2", "4" matching the data IDs "1", "2", "4", and obtains information about the tasks respectively corresponding to the task IDs "1", "4" of which task states are "waiting".

Then, the task scheduler 43 registers the work unit ID "1" requesting the task in such a manner that the work unit ID "1" is associated with each of the task IDs "1", "4", and registers "execution" as the task state (for example, see FIG. 16). Subsequently, the task scheduler 43 obtains the job content corresponding to the obtained job ID "1", and outputs, as the task information, the task ID, the job ID, the data ID, and the content of the job, to the work unit module 25 of the work unit ID "1".

The delivery (output) method of the task is not limited to the above. For example, the task scheduler 43 can output, to the work unit module 25, the tasks as many as the number equal to the average value of the number of data units allocated to each work unit module 25. First, the task scheduler 43 calculates the total summation of the number of data units allocated to each work unit module 25. In the example of FIG. 7, three data units are allocated to the work unit module 25 of the work unit ID "1". Three data units are allocated to the work unit module 25 of the work unit ID "2". Two data units are allocated to the work unit module 25 of the work unit ID "3". Therefore, the task scheduler 43 calculates 8 (=3+3+2) as the total summation of the number of data units. It should be noted that the total summation of the number of data units can be calculated by the product of the redundancy degree number r (=2) and the number of data units d (=4). Then, the task scheduler 43 divides the total summation of the calculated number of data units by the number of work units w (=3) to calculate the average value (=2.6).

Then, the task scheduler 43 obtains tasks as many as the number equal to or less than the calculated average value. For example, in a case where the calculated average value is 2.6, the task scheduler 43 obtains up to two tasks. For example, the task scheduler 43 selects any two tasks from the three tasks (the task IDs "1", "3", "4"). Then, the task scheduler 43 outputs the selected two tasks to the work unit module 25 of the work unit ID "2". As described above, by setting the maximum value of the tasks that are output at a time, all of the divided processing requests with the data units allocated to the predetermined work unit modules 25 are less likely to be output to other data unit processors. Therefore, this reduces the number of data unit processors incapable of performing processing for the divided processing request. As a result, the processing on all the divided processing requests (data units) can be done quickly, and the throughput can be improved.

Subsequently, the details of the configuration of the task collector 23 for receiving the task execution result group from the work unit module 25 will be explained. The task collector 23 includes a task result receiver 51 and a job result output module 52.

The task result receiver 51 stores the task execution result group received from the work unit module 25 to the task storage 45 for each task. More specifically, the task result receiver 51 searches a corresponding record from the task storage 45 by using the task ID of the task included in the task execution result group as the key, and stores the task execution result of the task as the task result. The task result receiver 51 stores "completed" to the task storage 45 as the task state. Subsequently, after the task result receiver 51 receives a task execution result, the task result receiver 51 outputs a completion determination request of a job to the job result output module 52.

The job result output module 52 performs the completion determination processing of the job, and in a case where all the tasks associated with the job are "completed", summary processing of the task is performed, and a result of the job is generated and output to the client. More specifically, the job result output module 52 makes the task group stored in the task storage 45 into groups with each job ID, and determines, for job ID, whether all the task states of the task group associated with the job ID are "completed" or not. Then, in a case where, for each job ID, all the task states of the tasks associated with the job ID are "completed" (for example, FIG. 18), the job result output module 52 determines that the job ID in question is completed. Then, the job result output module 52 obtains a task result of the task associated with the job ID in the task storage 45 of the job, performs summary processing on the task result, and generates a job result. The summary processing may be any processing performed on the task result, and the job result generated therefrom may be anything. The job result output module 52 does nothing on the job of the job ID that has not yet been completed. Subsequently, the job result output module 52 returns the job result of the completed job back to the job client 12, and changes the job state of the corresponding job ID of the job storage 44 to "completed" (for example, FIG. 19).

Figure 20:
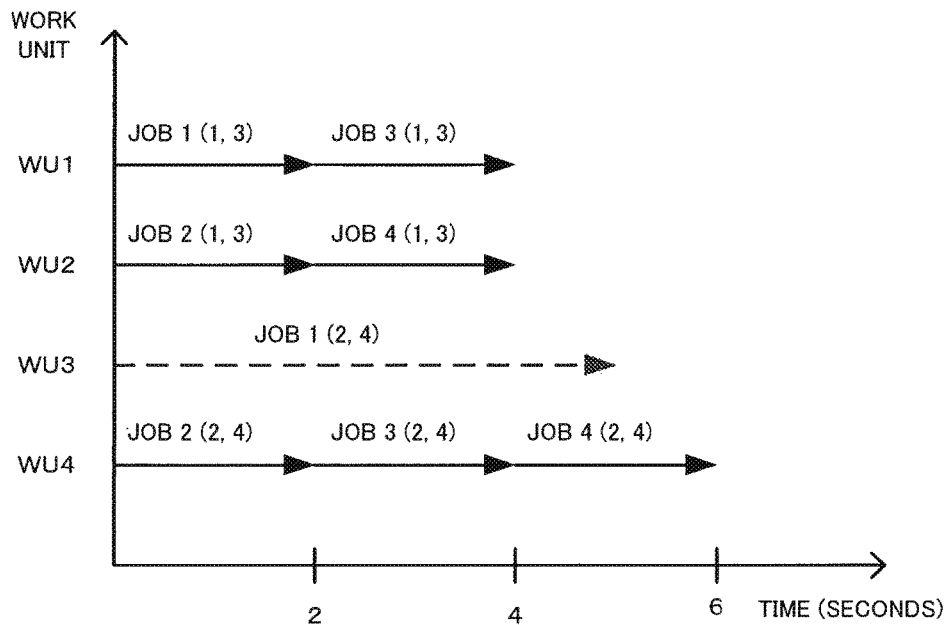
FIG. 20 is a figure for explaining timing up to a job completion.
Figure 21:
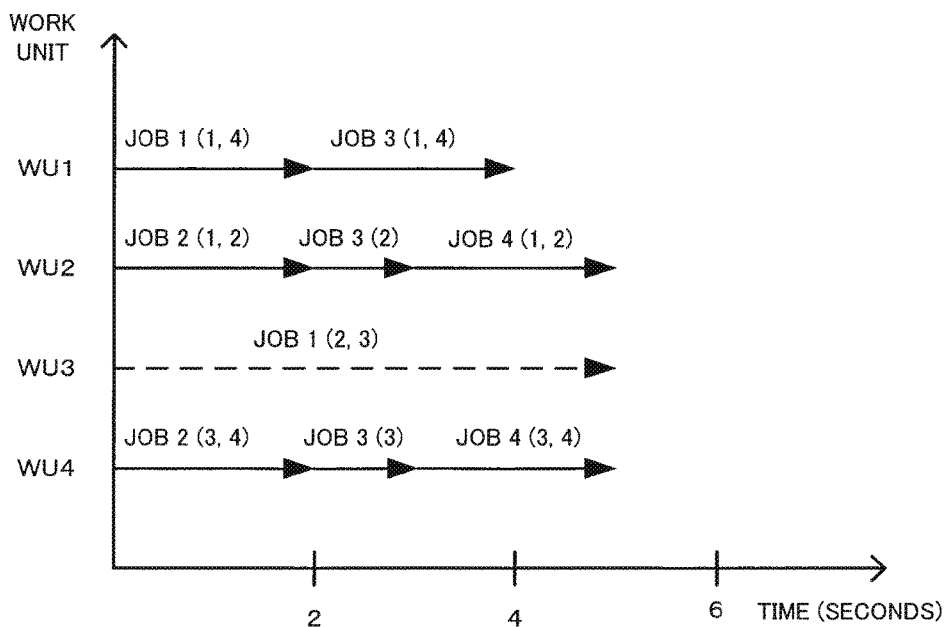
FIG. 21 is a figure for explaining timing up to a job completion.

In this case, processing up to a job completion with a difference in the standard deviation of the mirror table values will be explained with reference to FIGS. 20 and 21. FIG. 20 illustrates a timing chart up to a job completion of a data arrangement pattern (for example, FIG. 8) in which the standard deviation of the mirror table values is high. FIG. 21 illustrates a timing chart up to a job completion of a data arrangement pattern (for example, FIG. 10) in which the standard deviation of the mirror table values is the minimum. In the examples of FIGS. 20 and 21, four tasks "1" to "4" are allocated to four jobs, i.e., the jobs "1" to "4", respectively. Therefore, the data units, which are the targets of the task, are considered to be allocated as shown in the data arrangement pattern of FIG. 8 or FIG. 10. In this case, it is considered that it takes a second to complete a single task (processing performed on the data unit). Further, the task scheduler 43 is considered to output the tasks corresponding to the jobs in the ascending order of the number of the job (i.e., the order starting from the job "1").

In the example of FIG. 20, the data units are considered to be stored as shown in the data arrangement pattern of FIG. 8. More specifically, for example, the work unit modules "WU1", "WU2" previously store the data units of the data IDs "1", "3" respectively corresponding to the jobs 1 to 4. On the other hand, the work unit modules "WU3", "WU4" previously store the data units of the data IDs "2", "4" respectively corresponding to the jobs 1 to 4.

In the example of FIG. 20, first, the work unit module "WU1" outputs the task request to the task scheduler 43, and obtains the tasks "1", "3" corresponding to the job "1" (hereinafter referred to as job 1 (1, 3)). Then, the work unit module "WU1" executes the obtained task. Likewise, the work unit module "WU2" obtains the job 2 (1, 3), and executes the obtained task. Subsequently, the work unit module "WU3" obtains and executes the job 1 (2, 4), and the work unit module "WU4" obtains and executes the job 2 (2, 4). Therefore, the task scheduler 43 can output all the tasks for the jobs "1", "2".

An example will be explained in which a failure and the like occurs in the work unit module "WU3" in such case and it takes five seconds to complete the job 1 (2, 4). When the job 1 (1, 3) is completed (two seconds elapses), the work unit module "WU1" subsequently obtains and executes the job 3 (1, 3). Likewise, when the job 2 (1, 3) is completed, the work unit module "WU2" subsequently obtains and executes the job 4 (1, 3). Therefore, all of the tasks "1", "3" respectively corresponding to the jobs "1" to "4" can be executed.

On the other hand, when the job 2 (2, 4) is completed, the work unit module "WU3" is executing the job 1 (2, 4), and therefore, the work unit module "WU4" obtains and executes the job 3 (2, 4). Then, when the job 3 (2, 4) is completed, the work unit module "WU3" is still executing the job 1 (2, 4), and therefore, the work unit module "WU4" obtains and executes the job 4 (2, 4). Therefore, in the example of FIG. 20, it takes six seconds to complete all the tasks respectively corresponding to the jobs "1" to "4".

In contrast, in the example of FIG. 21, data unit modules are considered to be stored as shown in the data arrangement pattern of FIG. 10. More specifically, for example, the work unit module "WU1" previously stores the data units of the data IDs "1", "4" respectively corresponding to the jobs 1 to 4. Then, the work unit module "WU2" previously stores the data units of the data IDs "1", "2" respectively corresponding to the jobs 1 to 4. Likewise, the work unit module "WU3" previously stores the data units of the data IDs "2", "3" respectively corresponding to the jobs 1 to 4. The work unit module "WU4" previously stores the data units of the data IDs "3", "4" respectively corresponding to the jobs 1 to 4.

In the example of FIG. 21, first, the work unit module "WU1" obtains and executes the job 1 (1, 4). Subsequently, the work unit module "WU3" obtains and executes the job 1 (2, 3). Likewise, the work unit module "WU2" obtains and executes the job 2 (1, 2), and the work unit module "WU4" obtains and executes the job 2 (3, 4). Therefore, the task scheduler 43 can output all the tasks for the jobs "1", "2". Like the example of FIG. 20, an example will be explained in which a failure and the like occurs in the work unit module "WU3" in such case and it takes five seconds to complete the job 1 (2, 3).

When the job 1 (1, 4) is completed (two seconds elapses), the work unit module "WU1" subsequently obtains and executes the job 3 (1, 4). Subsequently, when the job 2 (1, 3) is completed, the work unit module "WU2" subsequently obtains and executes the job 4 (1, 3). Therefore, all of the tasks "1", "3" respectively corresponding to the jobs "1" to "4" can be executed. Subsequently, when the job 2 (1, 2) is completed, the work unit module "WU2" obtains and executes the job 3 (2). Subsequently, when the job 2 (3, 4) is completed, the work unit module "WU4" obtains and executes the job 3 (3). Therefore, the task scheduler 43 can output all the tasks for the job "3".

Then, when the job 3 (2) is completed (one second elapses), the work unit module "WU2" obtains and executes the job 4 (1, 2). Likewise, when job 3 (3) is completed, the work unit module "WU4" obtains and executes the job 4 (3, 4). Therefore, in the example of FIG. 21, the time it takes to complete all the tasks respectively corresponding to the jobs "1" to "4" is five seconds. As described above, the data arrangement pattern satisfying the conditions (A) to (D) explained above is selected, whereby the throughput can be improved.

As described above, in the present exemplary embodiment, the data units are arranged in the work unit module 25 so that the degrees of redundancies of the data units are the same. Then, the equal numbers of data units are arranged in the work unit modules 25, so that the standard deviation of the numbers of data units held by the work unit modules 25 become the minimum. Further, the data arrangement pattern is generated to attain an arrangement in which the standard deviation of the numbers of the work unit modules 25 holding the identical copied data units becomes smaller. When such data arrangement pattern is generated, not only the maintenance of the redundancy of the system but also the load distribution of the work unit modules 25 can be made possible.

Further, the work unit module 25 having data units arranged therein outputs a list of data IDs held by the work unit module 25 to the task scheduler 43. Then, the task scheduler 43 returns a task that has not yet obtained by another work unit module 25 from among the task group. The task group is to coincide with identifiers of the data units of the processing target. Therefore, the task scheduler 43 outputs only the tasks that are required by the work unit module 25 and that are the task group having not yet executed by another work unit module 25. Accordingly, even if the data units are redundantly arranged, the task performed on the same data unit is not processed repeatedly. With such configuration, multiple different task groups can be executed in a distributed manner at a time by different work unit modules 25, and therefore, the time it takes to complete the job can be reduced while the degree of redundancy of the system is maintained.

(Operation)

In the following explanation, the operation procedure of the entire distributed processing system 1 will be explained in details with reference to FIG. 22. At first, before a job is fed from the client, each work unit module 25 is required to be deployed with data which are the processing target. After the data are deployed, an operation procedure of a job execution is operated with a job registration with the job client 12, the task scheduler 43, the work unit module 25, and the task collector 23, so that the job is executed, and the job result is output to the client. In the following explanation, the operation procedure of the data deployment, the procedure of the job registration, and the procedure of the job execution will be explained in details.

First, the operation procedure of the data deployment according to the present exemplary embodiment will be explained with reference to FIG. 22. In this case, first, the work unit management module 21 registers work units to the work unit storage 31 (step S1). More specifically, first, the system management client 13 issues unique (individual) work unit IDs to multiple work unit modules 25. Then, the work unit management module 21 obtains the work unit ID issued by the system management client 13, and registers (stores) the work unit ID to the work unit storage 31. For example, as shown in FIG. 2, in a case where there are three work unit modules 25, the work unit storage 31 stores three work unit IDs and information about the work unit modules 25 corresponding to the work unit IDs (for example, work unit names) in such a manner that the work unit IDs and the information are associated with each other.

Subsequently, the data arrangement management module 24 registers master data to the data arrangement storage 64 (step S2). More specifically, first, the system management client 13 respectively issues unique data IDs to multiple data units. Then, the data arrangement management module 24 obtains the data ID issued by the system management client 13, and registers the data ID to the data arrangement storage 64. For example, as shown in FIG. 3, the data IDs are stored in such a manner that the data IDs are respectively associated with four data units (data contents). It should be noted that the data content may be any kind of data content as long as it is a content that can be executed by the task execution module 72 of the work unit module 25.

Then, the data arrangement planning module 61 performs data unit arrangement planning processing (step S3). The data unit arrangement planning processing will be explained with reference to FIG. 23. In the data unit arrangement planning processing of FIG. 23, first, the data arrangement planning module 61 generates an arrangement matrix of data in which the work unit ID is the vertical axis, and the data ID is the horizontal axis (step S21). Subsequently, the data arrangement planning module 61 divides the area of the data arrangement matrix generated in the processing of step S21 into an ideal data arrangeable area and an ideal data non-arrangeable area (step S22).

More specifically, the data arrangement planning module 61 divides, in the ascending order of the data ID, the area of the data ID column of the data arrangement matrix into areas as many as the number of combinations (wCr) of the number of work units w and the redundancy degree number r of data units. In this case, in the area of the data arrangement matrix, an area where the number of columns of the divided area is wCr is adopted as an the ideal data arrangeable area, an area where the number of columns of the divided area is a value less than wCr is adopted as an ideal data non-arrangeable area. For example, in a case where the number of work units w is three, the redundancy degree number r of data units is two, and the number of data units d is four, then, the number of combinations of the number of work units w and the redundancy degree number r is 3C2=3. For this reason, as shown in FIG. 4, the area of the columns of the data IDs "1" to "3" becomes as an ideal data arrangeable area, and as shown in FIG. 5, the area of the column of the data ID "4" becomes an ideal data non-arrangeable area.

Subsequently, the data arrangement planning module 61 obtains a single ideal data arrangeable area divided in the processing of step S22 (step S23). In the example of FIG. 4, there is a single data arrangeable area, and therefore, the ideal data arrangeable area indicating the area of the columns of the data ID1 to ID3 is obtained. Subsequently, the data arrangement planning module 61 calculates a data arrangement pattern for the data arrangeable area obtained in the processing of step S23 (step S24).

More specifically, the data arrangement planning module 61 calculates a data arrangement pattern which is a combination for selecting the work unit ID of the redundancy degree number r of data units given in advance from all the work unit IDs. Then, the combination of the work unit IDs are allocated to the data IDs so as to uniformly include all the patterns of the combinations for selecting the redundancy degree number r of data units from this work unit ID in all the ideal data arrangeable area. If this condition is satisfied, a combination of any work unit IDs may be arranged in the data ID column in the ideal data arrangeable area. In a case where there exist multiple data arrangement patterns for the ideal data arrangeable area calculated here, any one of multiple data arrangement patterns is selected (for example, FIG. 4).

Subsequently, the data arrangement planning module 61 determines whether all the ideal data arrangeable areas have been obtained or not (step S25). In a case where all the ideal data arrangeable area is determined not to have been obtained, the processing of step S23 is performed again, and the subsequent processing is repeated. On the other hand, in a case where all the ideal data arrangeable area is determined to have been obtained, the processing of step S26 is subsequently performed. In the example of FIG. 4 explained above, there is a single ideal data arrangeable area, and therefore, the processing of step S26 is subsequently performed.

In step S26, the data arrangement planning module 61 performs the data arrangement planning generation processing of the ideal data non-arrangeable area. The data arrangement planning generation processing of the ideal data non-arrangeable area will be explained with reference to FIG. 24.

Figure 24:
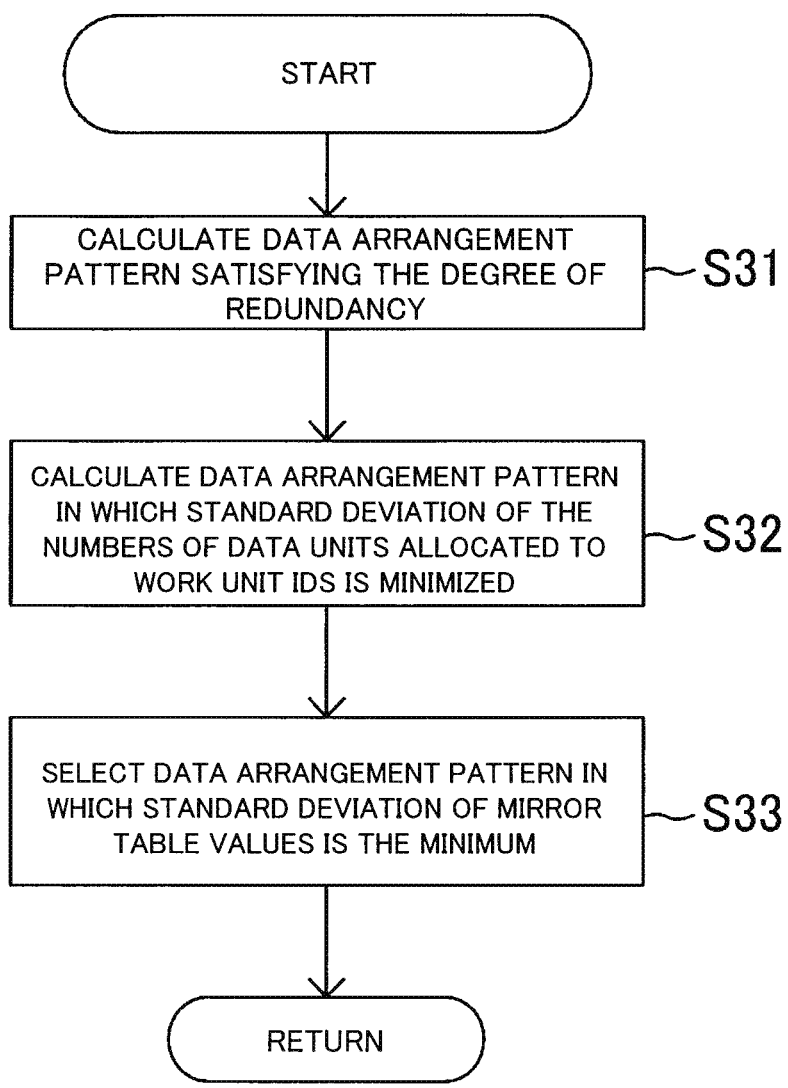
FIG. 24 is a figure for explaining an operation of a data arrangement planning module.

In the data arrangement planning generation processing of FIG. 24, first, an arrangement pattern satisfying the degree of redundancy is calculated (step S31). More specifically, first, the data arrangement planning module 61 calculates the combination wCr of the work unit IDs for selecting r work unit IDs from among w work unit IDs. Then, the data arrangement planning module 61 calculates a data arrangement pattern arranging (allocating) a combination of the work unit IDs for the number of columns of the data IDs (for example, one) in the ideal data non-arrangeable area. In the example of FIG. 5, the data arrangement planning module 61 calculates a combination of the work unit IDs (1, 2), (2, 3), (1, 3) which are to be arranged in the column of which data ID is four as the data arrangement pattern.

Subsequently, the data arrangement planning module 61 calculates a data arrangement pattern in which the standard deviation of the numbers of data units allocated to the work unit IDs is minimized from among the data arrangement patterns calculated in the processing of step S31 (step S32). More specifically, a data arrangement pattern, which includes a work unit ID where the number of arranged data units is minimized and in which the standard deviation of the numbers of data units allocated to each work unit ID is minimized is calculated from among the calculated data arrangement patterns. In the example of FIG. 5, the data arrangement planning module 61 calculates the combination of the work unit IDs (1, 2), (2, 3), (1, 3) as the data arrangement pattern.

Then, the data arrangement planning module 61 selects a data arrangement pattern in which the standard deviation of the mirror table values is the minimum from among the data arrangement patterns calculated in the processing of step S32 (step S33). The mirror table value is the number of data units of the identical data ID allocated to each of the two work units.

FIG. 5 is a figure illustrating an example in a case where the combination of the work unit IDs (1, 2) is selected as the data arrangement pattern of the data non-arrangeable area (the column in which data ID is four). As shown in FIG. 6, the mirror table value for the combination of the work unit IDs (1, 2) is "2", the mirror table value for the combination (2, 3) is "1", and the mirror table value for the combination (1, 3) is "1". For example, the data arrangement planning module 61 selects the combination of the work unit IDs (1, 2), (2, 3), (1, 3) as the data arrangement pattern.

As described above, in a case where there are multiple data arrangement patterns selected in the processing of step S33, the data arrangement planning module 61 selects any one of the multiple data arrangement patterns, and adopts the selected data arrangement pattern as the data arrangement pattern in the ideal data non-arrangeable area. For example, the data arrangement planning module 61 selects the combination of the work unit IDs (1, 2) for the column of which data ID is four. Therefore, the data arrangement planning module 61 completes generation of data arrangement planning in all the area of the data arrangement matrix, and the processing proceeds to step S27 of FIG. 23.

Figure 22:
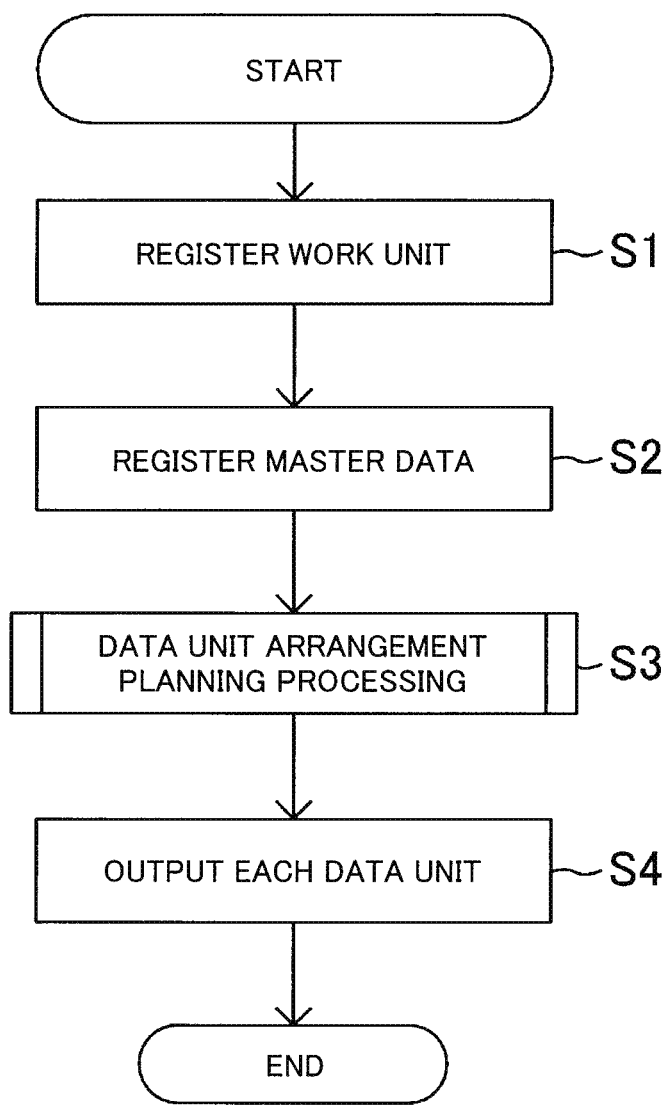
FIG. 22 is a figure for explaining an operation of an information processing apparatus.
Figure 23:
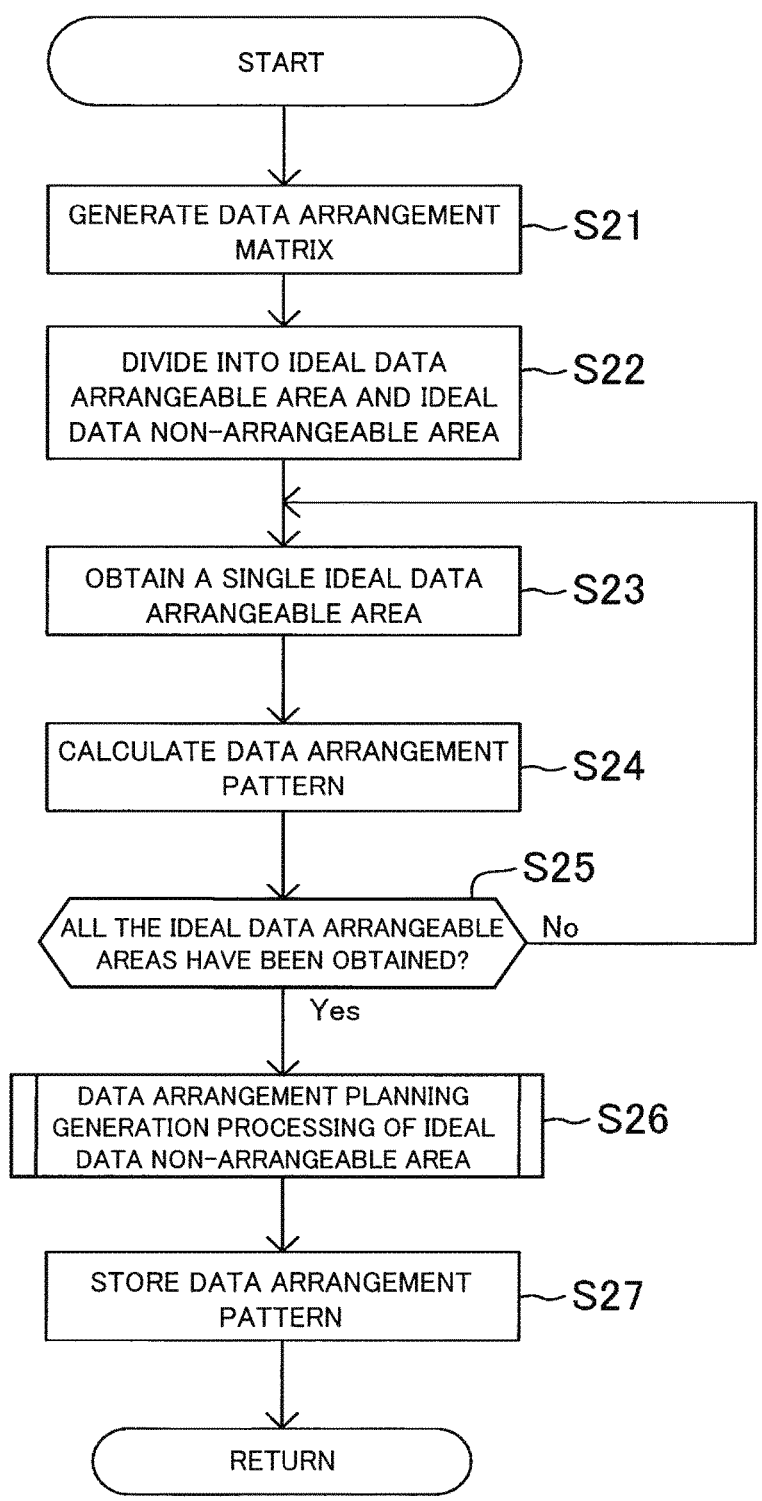
FIG. 23 is a figure for explaining an operation of a data arrangement management module.

Then, in step S27 of FIG. 23, the data arrangement planning module 61 stores the data arrangement matrix (step S27). More specifically, the data arrangement planning module 61 makes the data arrangement pattern of the ideal data arrangeable area calculated in the processing of step S24 in FIG. 23 and the data arrangement pattern of the ideal data non-arrangeable area calculated in the processing of step S33 in FIG. 24 into a single data arrangement matrix, and stores the data arrangement matrix to the data arrangement storage 64 (for example, FIG. 7). Then, after the processing of step S27, the processing proceeds to step S4 of FIG. 22.

Then, in step S4 of FIG. 22, the data arrangement execution module 62 outputs each data unit on the basis of the data arrangement matrix stored in the processing of step S27 (step S4). More specifically, first, the data arrangement execution module 62 obtains the data unit corresponding to the data ID allocated to each work unit ID from the master data stored in the master data storage 63 on the basis of the data arrangement matrix. Then, the data arrangement execution module 62 outputs the obtained data unit (copied data unit) and the data ID associated with the copied data unit to the work unit module 25 indicated by the work unit ID. Then, the work unit module 25 associated the data ID and the copied data unit which are output from the data arrangement management module 24, and stores the data ID and the copied data unit to the copied data storage 73. Therefore, each work unit module 25 can execute predetermined processing on the data unit stored in the copied data storage 73.

Figure 25:
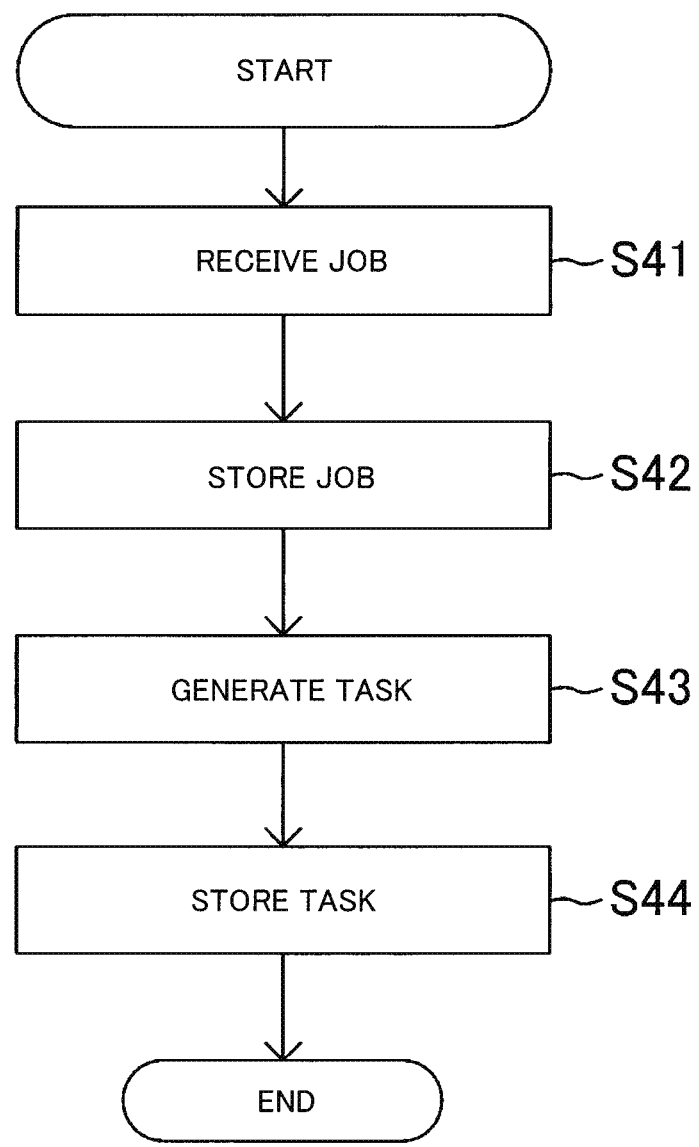
FIG. 25 is a figure for explaining an operation of a task management module.

Subsequently, the processing that is performed in a case where the job which is fed from the client is executed will be explained with reference to FIG. 25. First, the job receiver 41 of the task management module 22 receives a job which is output from the job client 12 (step S41). This job expresses a processing request for the master data. Subsequently, the job receiver 41 stores the job that received in the processing of step S41 (step S42). More specifically, job receiver 41 stores, to the job storage 44, the job ID unique to each job and "waiting" which serves as the job state, in such a manner that the job ID and "waiting" are associated with each other (for example, FIG. 8).

Subsequently, the task generator 42 generates a task corresponding to the job received in the processing of step S41 (step S43). More specifically, the task generator 42 generates as many tasks as the number of data IDs (data units) stored in the master data storage 63. Then, the task generator 42 stores the task generated in the processing of step S43 (step S44). More specifically, the task generator 42 stores, to the task storage 45, the unique task ID that is set for each generated task, the job ID which the origin from which the task is divided, the data ID of the target of the task, and "waiting" serving as the task state, in such a manner that the unique task ID, the job ID, the data ID, and "waiting" are associated with each other (for example, FIG. 14). It should be noted that the data ID of the target of the task must be different for each task. After the processing of step S44, the processing is terminated. Therefore, the task for each data unit can be allocated.

Figure 26:
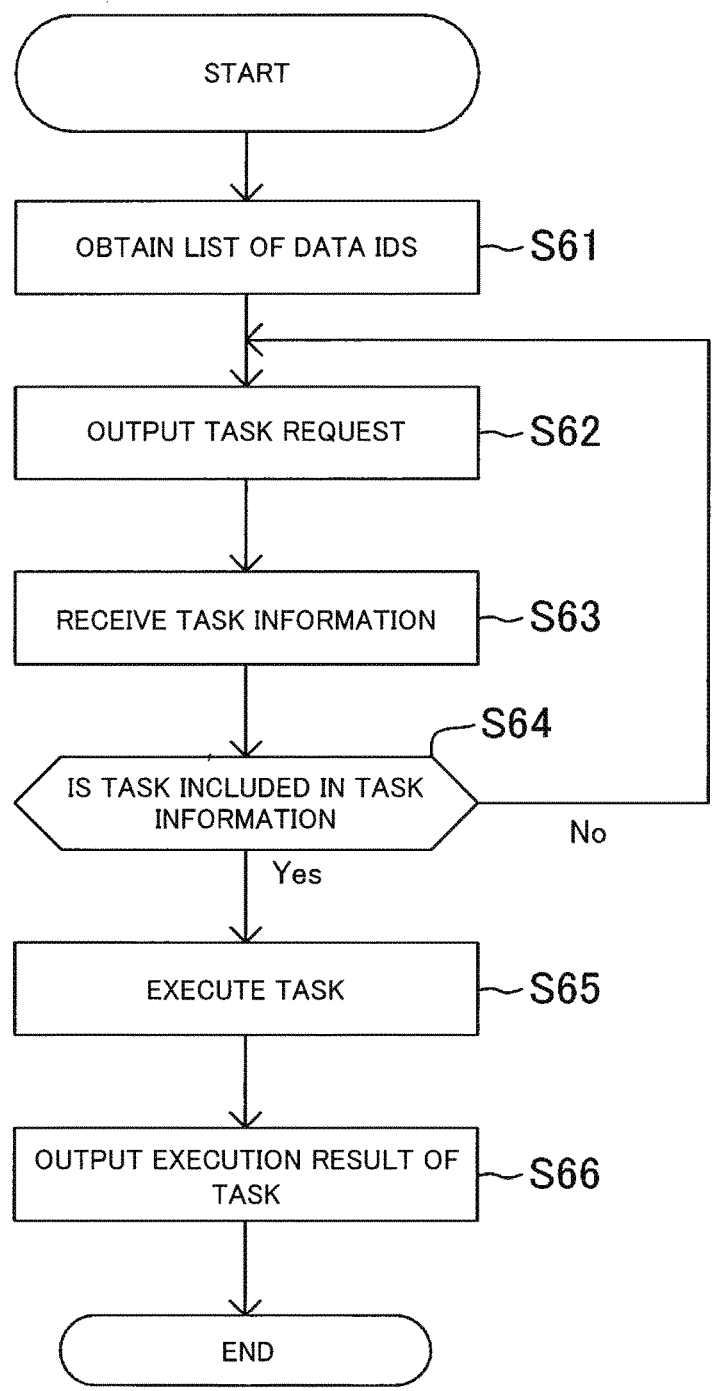
FIG. 26 is a figure for explaining an operation of a work unit module.
Figure 27:
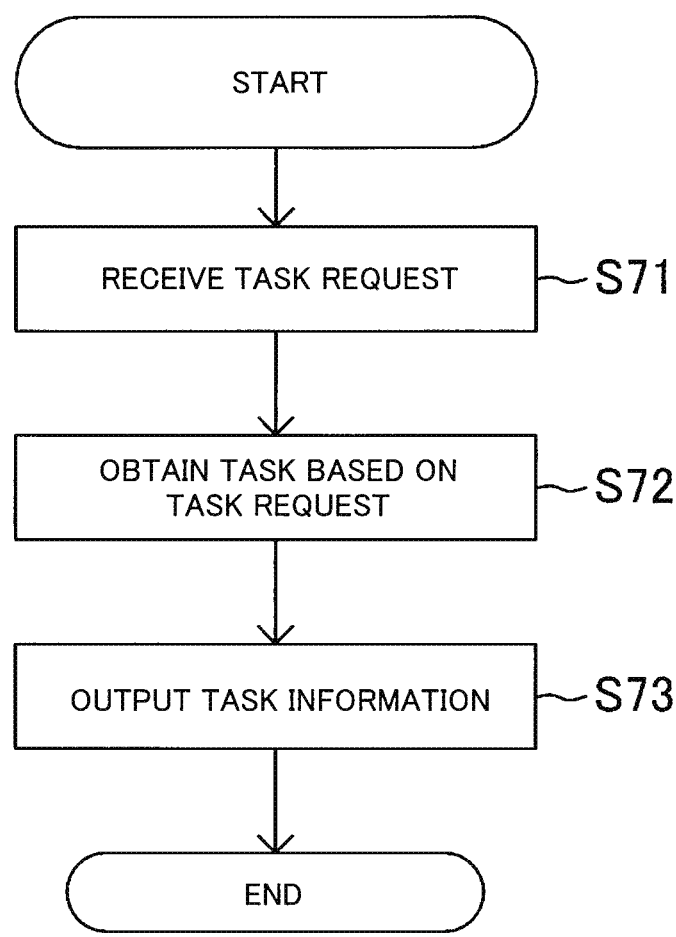
FIG. 27 is a figure for explaining an operation of a task scheduler.
Figure 28:
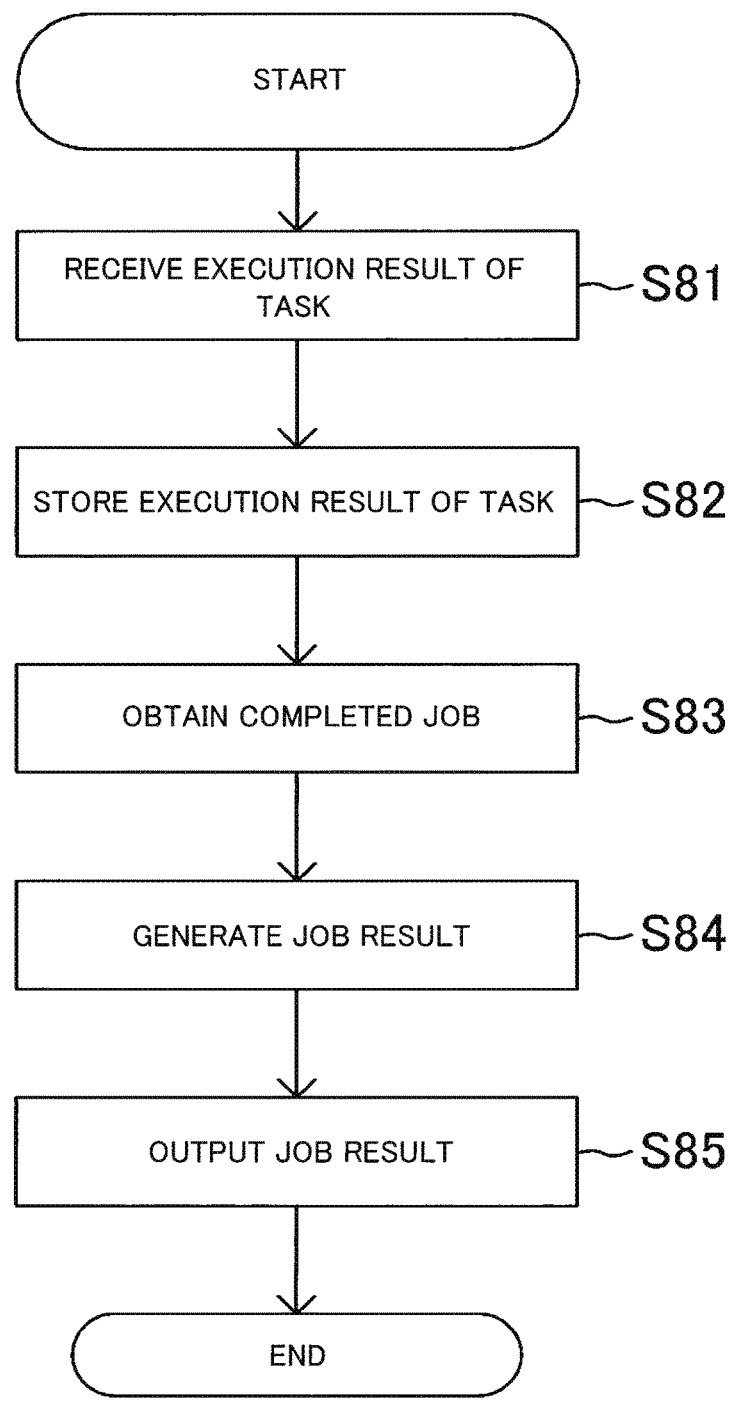
FIG. 28 is a figure for explaining an operation of a task collector.

Subsequently, the processing that is performed when the task is executed will be explained with reference to FIGS. 26 to 28. The work unit group is constituted by multiple work unit modules 25, and each work unit module 25 is considered to operate independently.

First, the work unit module 25 obtains a list of data IDs (data units) stored in the copied data storage 73 (step S61). Subsequently, the work unit module 25 outputs a task request to the task management module 22 (step S62). This task request includes a list of data IDs obtained in the processing of step S61.

Subsequently, the task scheduler 43 receives the task request which is output from the work unit module 25 (step S71 of FIG. 27). Subsequently, the task scheduler 43 obtains the task based on the task request received in the processing of step S71 (step S72). More specifically, the task scheduler 43 searches, from the task storage 45, a task ID group of which state of the task is "waiting" and which matches the list of the data IDs included in the received task list, and obtains all the tasks or some of the tasks (task group).

Then, the task scheduler 43 outputs the task information based on the tasks obtained in the processing of step S72 (step S73). More specifically, first, the task scheduler 43 changes the task state of each of the obtained tasks to "execution" (for example, FIG. 16). The task scheduler 43 stores the work unit ID of the work unit module 25 that has output the task request, in association of each of the obtained tasks.

Subsequently, the task scheduler 43 obtains a list of the job IDs corresponding to the task IDs of the obtained tasks. Subsequently, the task scheduler 43 obtains a job content corresponding to the job ID from the job storage 44. Then, the task scheduler 43 outputs, as the task information, the task ID, the job ID corresponding to the task ID, the data ID corresponding to the task ID, and the content of the job corresponding to the job ID to the work unit module 25 that has output the task request.

Subsequently, the task request module 71 of the work unit module 25 receives the task information (step S63). Subsequently, the task request module 71 of the work unit module 25 determines whether a task is included in the task information (step S63). For example, in a case where no task is included in the received task information (step S63:No), and more specifically, in a case where there is no task for the task request that is output from the work unit module 25 (for example, another work unit module 25 has executed the task), the processing in step S61 is performed again, and the task request module 71 performs a request of a subsequent task.

On the other hand, in a case where a task is included in the task information (step S63:Yes), the task execution module 72 executes the task (step S65). For example, the task execution module 72 obtains a data content of the data unit, which is the target of the task, from the copied data storage 73, by using the data ID included in the task information as the key. Subsequently, the task execution module 72 executes the processing of the task on the basis of the obtained data content and the job content of the job of the job ID corresponding to the task ID. The content to be executed may be any processing performed with the job content and the data content.

Then, the task execution module 72 outputs the execution result of the task (step S66). More specifically, when the task execution module 72 has completed the execution of all the task groups included in the response of the task request, the task execution module 72 outputs, as the execution result of all the tasks, a list of execution result of a task including the task ID, the job ID associated with the task ID, and the task result serving as the processing result of the task, to the task result receiver 51 as the task execution result group. After the processing of step S66, the processing in step S62 is performed again. More specifically, the task request module 71 outputs a new task request.

Subsequently, the processing of the task collector 23 receiving the execution result of the task will be explained with reference to FIG. 28. First, the task result receiver 51 receives the execution result of the task that is output in the processing of step S66 in FIG. 26 (step S81). Subsequently, the task result receiver 51 stores the received list of the task execution result to the task storage 45 for each task (step S82). More specifically, the task result receiver 51 searches a corresponding record from the task storage 45 by using the task ID included in the task execution result as the key, and stores, to the task storage 45, the task result which is the task execution result and "completed" which is the completion state as the task state.

Subsequently, the job result output module 52 obtains the completed job (step S83). For example, the job result output module 52 obtains those of which state of the task group associated with the job ID is "completed" for each job ID. Subsequently, the job result output module 52 generates a job result (step S84). For example, the job result output module 52 performs summary processing on the task result associated with the job ID from the task storage 45, and generates the job result. The summary processing may be any processing performed on the task result, and the job result generated therefrom may be anything. Then, the job result output module 52 outputs the job result of the completed job to the job client 12 (step S85). At this occasion, the job result output module 52 changes the state of the job of the corresponding job ID in the job storage 44 to "completed" which is the completed state (for example, FIG. 18).

As described above, in the present exemplary embodiment, the data units are arranged in the work unit modules 25 in such a manner that the degrees of redundancies of the data units become the same. Then, the equal number of data units are arranged in the work unit modules 25 so that the standard deviations of the numbers of data units held by the work unit modules 25 become the minimum. Further, the data arrangement pattern is generated to attain an arrangement in which the standard deviation of the numbers of the work unit modules 25 holding the identical copied data units becomes smaller. When such data arrangement pattern is generated, not only the maintenance of the redundancy of the system but also the load distribution of the work unit modules 25 can be made possible.

Further, the work unit module 25 having data units arranged therein outputs a list of data IDs held by the work unit module 25 to the task scheduler 43, and the task scheduler 43 returns a task that has not yet obtained by another work unit module 25 from among the task group of which identifiers of the data units of the processing target are the same. Therefore, since the task scheduler 43 outputs only the tasks that are required by the work unit module 25 and that are the task group having not yet executed by another work unit module 25, the task on the same data unit is not processed repeatedly even if the data units are redundantly arranged. With such configuration, multiple different task groups can be executed in a distributed manner at a time by different work unit modules 25, and therefore, the time it takes to complete the job can be reduced while the degree of redundancy of the system is maintained.

In the present exemplary embodiment, the data arrangement pattern makes the standard deviation of the numbers of arranged data for the work unit modules 25 to be the minimum, and therefore, the number of maximum tasks that can be processed at a time by the work unit modules 25 is equalized among the work unit modules 25, and therefore, the amounts of processing of the work unit modules 25 are likely to be uniform. Further, arrangement planning is made so that the standard deviation of the numbers of identical data units held by the work unit modules 25 becomes smaller. Therefore, even in a case where the task execution time for the task targeted on any given data unit becomes long in any given work unit module 25, another work unit module 25 holding the identical copied data unit as the data unit group held by the work unit module 25 executing the slow task can execute the task associated with another data ID held by the work unit module 25 executing the slow task. Therefore, the load balance can be achieved between the work unit modules 25 in terms of data arrangement.

In addition, pull-type task acquisition is performed, in which the work unit module 25 having the copied data unit arranged therein obtains the task by outputting the list of the data IDs held by the work unit module 25 to the task scheduler 43, and when the obtained task group is finished, the work unit module 25 obtains a subsequent task. Therefore, when combined with this data arrangement method, the load balance of the processing of the tasks can be achieved between the work unit modules 25. Therefore, with such data arrangement and the acquisition method of the tasks, the load balance of the processing of the tasks can be achieved between the work unit modules 25. As a result, in a case where the number of jobs is finite, the time it takes to complete all the jobs can be reduced, and in a case where there are multiple jobs, the throughput of the job can be improved.

In the present exemplary embodiment, the data arrangement is performed so that the algorithm of the data arrangement planning module 61 for arranging the data units in a distributed manner satisfies a combination including a condition that the redundancy of the data units is satisfied, a condition that the standard deviation of the numbers of data units held by the work unit modules 25 is minimized, and a condition that the total summation value of the number of the work unit modules 25 holding the identical data units is minimized. More specifically, the data arrangement planning module 61 performs the data arrangement capable of maintaining balance of the load while satisfying the degree of redundancy with the least required number of data. Therefore, the distributed data can be maintained with a less external storage or memory. As a result, the data units can be arranged in a distributed manner by using a less number of servers of the work unit modules 25.

In the present exemplary embodiment, the work unit module 25 uses a method for obtaining a task according to the pull-type on the basis of such data arrangement. Therefore, the work unit module 25 can monitor the system load without calculating the load from the statistics information obtained by monitoring the system load. As a result, the loads of the tasks of the work unit modules 25 can be distributed without giving the loads to the work unit modules 25.

Second Exemplary Embodiment

Figure 29:
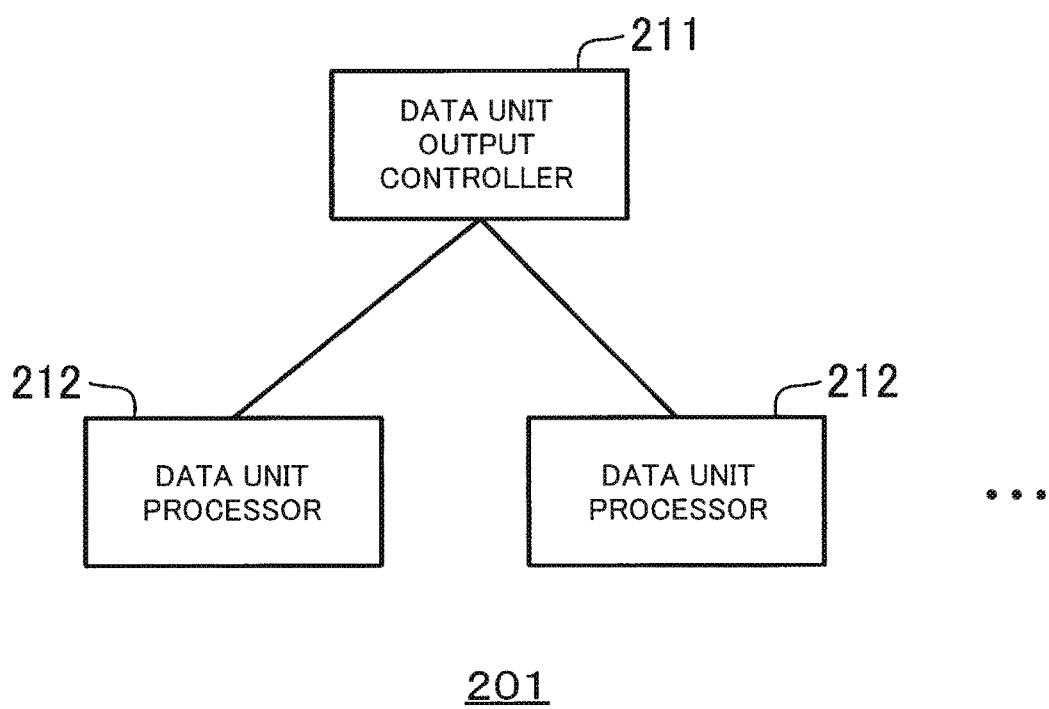
FIG. 29 is a block diagram illustrating functions of an information processor according to a second exemplary embodiment of the present invention.

Subsequently, a distributed processing system according to the second exemplary embodiment of the present invention will be explained with reference to FIG. 29.

A distributed processing system 201 according to the second exemplary embodiment includes a data unit output controller 211 (data unit output control means) for outputting, to multiple data unit processors 212, copied data units obtained by respectively copying multiple data units for a number that is set in advance, wherein the data unit output controller 211 respectively allocates the output destinations of the identical multiple copied data units to different data unit processors 212, and for each combination of at least two data unit processors 212 that is set in advance, the number of the identical copied data unit groups in which the identical copied data units are allocated to the data unit processors 212 made into a combination is obtained, and the output destinations of the multiple copied data units are respectively allocated to the data unit processors 212, so that the degree of variation of the number of copied data unit groups obtained for each combination of the data unit processors 212 becomes smaller.

According to the above configuration, in a case where the data unit output controller 211 outputs the copied data units, which are obtained by copying each of multiple data units for the number of times that is set in advance, to multiple data unit processors 212, for example, the multiple copied data units of which identification information of the data units is the same are respectively allocated to different data unit processors 212. For each combination of at least two data unit processors 212 that is set in advance, the data unit output controller 211 obtains the number of the identical copied data unit groups (mirror table values) in which the identical copied data units are allocated to the data unit processors made into the combination. Further, the data unit output controller 211 respectively allocates the output destinations of multiple copied data units to the data unit processors 212 so that the degree of variation of the mirror table values obtained for each combination of the data unit processors 212 becomes smaller. Therefore, the data unit processors 212 holding copies of the identical data unit are allocated in a distributed manner without being concentrated on a single data unit processor 212. Therefore, even in a case where a failure and the like occurs in the predetermined data unit processor, each data unit processor holding the same copied data unit as the copied data unit held by the data unit processor 212 in which a failure and the like occurs can perform predetermined processing on the copied data units on behalf of the data unit processor 212. As a result, the processing on all the data units can be done quickly, and the throughput can be improved.

The invention of the present application has been hereinabove explained with reference to the above exemplary embodiments, but the invention of the present application is not limited to the above exemplary embodiments. Various changes that can be understood by a person skilled in the art within the scope of the invention of the present application can be made in the configuration and the details of the invention of the present application.

<Supplemental Note>

Some or all of the above exemplary embodiments may be described as shown in the following Supplemental note s, but are not limited thereto.

(Supplemental Note 1)

An information processing apparatus includes, data unit output control means for outputting, to a plurality of data unit processors, copied data units obtained by respectively copying a plurality of data units for a number that is set in advance, the data unit output control means being configured to respectively allocate output destinations of a plurality of identical copied data units to different data unit processors, for each combination of at least two data unit processors that is set in advance, obtain a number of the copied data unit groups in which the identical copied data units are respectively allocated to the data unit processors made into a combination, and respectively allocate the output destinations of the plurality of copied data units to the data unit processors, so that the degree of variation of the number of copied data unit groups obtained for each combination of the data unit processors becomes smaller.

According to the above configuration, in a case where the data unit output control means outputs, to the plurality of data unit processors, the copied data units obtained by respectively copying the plurality of data units for the number that is set in advance, for example, the data unit output controller respectively allocates a plurality of copied data units of which identification information of data units is the same to different data unit processors. For each combination of at least two data unit processors that is set in advance, a number of the copied data unit groups in which the identical copied data units are respectively allocated to the data unit processors made into a combination (mirror table value) is obtained. The data unit output controller respectively allocates the output destinations of the plurality of copied data units to the data unit processors, so that the degree of variation of the number of the mirror table values obtained for each combination of the data unit processors becomes smaller. Therefore, the data unit processors holding copies of the identical data unit are allocated in a distributed manner without being concentrated on a single data unit processor. Therefore, even in a case where a failure and the like occurs in the predetermined data unit processor, each data unit processor holding the same copied data unit as the copied data unit held by the data unit processor in which a failure and the like occurs can perform predetermined processing on the copied data units on behalf of the data unit processor. As a result, the processing on all the data units can be done quickly, and the throughput can be improved.

(Supplemental Note 2)

The information processing apparatus according to Supplemental note 1, wherein, further, the data unit output control means respectively allocates the output destinations of the plurality of copied data units to the different data unit processors, so that the degree of variation of the number of copied data units allocated for each data unit processor becomes smaller.

According to the above configuration, the data unit output control means respectively allocates the output destinations of the plurality of copied data units to the different data unit processors, so that the degree of variation of the number of copied data units allocated for each data unit processor becomes smaller. Therefore, the copied data units are not output in such a manner that the copied data units are concentrated on a single data unit processor, and the copied data units are respectively output in a distributed manner to the plurality of data unit processors. As a result, even in a case where a failure and the like occurs in the predetermined data unit processor, another data unit processor can perform predetermined processing on behalf of the original data unit processor. As a result, the processing on all the data units can be done quickly, and the throughput can be improved.

(Supplemental Note 3)

The information processing apparatus according to Supplemental note 1 or 2, wherein the data unit output control means calculates the degree of variation, with respect to a predetermined reference value, of the number of copied data unit groups allocated with the identical copied data units obtained for each combination of the data unit processors, and respectively allocates the output destinations of the plurality of copied data units to the data unit processors, so that the degree of variation of the number of copied data unit groups thus calculated becomes smaller.

According to the above configuration, the data unit output control means calculates the degree of variation (for example, a standard deviation), with respect to a predetermined reference value, of the number of mirror table values obtained for each combination of the data unit processors. The data unit output control means respectively allocates the output destinations of the plurality of copied data units to the data unit processors, so that the standard deviation thus calculated becomes smaller. As described above, by reducing the degree of variation of the number of identical copied data units, the number of identical copied data units for each combination of the data unit processors can be equalized. As a result, the multiple copied data units can be more quickly and reliably distributed to multiple data unit processors.

(Supplemental Note 4)

The information processing apparatus according to any one of Supplemental notes 1 to 3, wherein the data unit output control means respectively allocates the output destinations of the plurality of copied data units to the data unit processors, so that the degree of variation of the number of copied data unit groups allocated with the identical copied data units obtained for each combination of the data unit processors becomes smaller, and a total summation of the number of copied data unit groups obtained for each combination of the data unit processors is minimized.

According to the above configuration, the data unit output control means respectively allocates the output destinations of the plurality of copied data units to the data unit processors, so that the degree of variation of the mirror table values obtained for each combination of the data unit processors becomes smaller, and a total summation of the mirror table values obtained for each combination of the data unit processors is minimized. As described above, in a case where there is an allocation pattern of data units in which the degree of variation of the number of copied data unit groups is the same, the number of redundant data units (copied data units) for the combination of the data unit processors can be reduced. Therefore, the processing requests for the data units are not output in such a manner that the processing requests are concentrated on a single data unit processor, and the processing requests are respectively output in a distributed manner to the plurality of data unit processors. As a result, the processing on all the data units can be done quickly, and the throughput can be improved.

(Supplemental Note 5)

The information processing apparatus according to any one of Supplemental notes 1 to 4, wherein the data unit output control means generates a data unit output table in which the data unit processor serving as the output destination and the copied data unit allocated to the data unit processor are associated with each other, and outputs the plurality of copied data units to the plurality of data unit processors on the basis of the generated data unit output table.

According to the above configuration, the data unit output control means generates a data unit output table (for example, a data arrangement matrix) in which the data unit processor and the data unit which is output to the data unit processor are associated with each other in order to allocate the copied data unit and the data unit processor. Therefore, the management and the control of the copied data units become easier, and the multiple copied data units can be more quickly and reliably output to data unit processors.

(Supplemental Note 6)

The information processing apparatus according to any one of Supplemental notes 1 to 5, further includes, processing request control means for obtaining a processing request for the plurality of data units, and generating a divided processing request divided the obtained processing request in association with each of the data units, and in a case where the processing request control means obtains identification information for identifying the copied data unit allocated to the data unit processor from the data unit processor, the processing request control means outputs, to the data unit processor, the divided processing request corresponding to the copied data unit identified by the obtained identification information.

According to the above configuration, the processing request control means obtains a processing request (for example, a job) for the plurality of data units, and generates a divided processing request (a task for each data unit) divided the obtained processing request in association with each of the data units. Then, in a case where the processing request control means obtains identification information for identifying the copied data unit allocated to the data unit processor from the data unit processor, the processing request control means obtains the task associated with the copied data unit allocated to the data unit processor, and outputs the task to the data unit processor. Therefore, for example, a processing request (job) for large-scale data is efficiently divided, and can be output to the data unit processors. As a result, the processing on the large-scale data can be done quickly, and the throughput can be improved.

(Supplemental Note 7)

The information processing apparatus according to Supplemental note 6, wherein the processing request control means outputs divided processing requests to the data unit processor, the divided processing requests having not yet output to another data unit processor chosen from among the divided processing requests corresponding to the copied data unit identified by the obtained identification information, and being as many divided processing requests as a number equal to or less than an average value obtained by calculating a total summation of the numbers of copied data units allocated to the data unit processors and dividing the calculated total summation by the number of data unit processors.

According to the above configuration, the processing request control means outputs, to the data unit processor, divided processing requests that has not yet output to another data unit processor, wherein the divided processing requests are as many as the number equal to or less than an average value obtained by calculating a total summation of the numbers of copied data units allocated to the data unit processors and dividing the calculated total summation by the number of data unit processors. Therefore, the number of copied data units treated by the data unit processor at a time is reduced, so that the number of divided processing requests that have not yet output to another data unit processor is increased. Therefore, all of the divided processing requests for the data units held by the predetermined data unit processor are less likely to be output to another data unit processor, and the number of data unit processors that cannot perform processing on the divided processing request is reduced. As a result, the processing for all the divided processing requests (data units) can be done quickly, and the throughput can be improved.

(Supplemental Note 8)

An information processing method includes, while outputting, to a plurality of data unit processors, copied data units obtained by respectively copying a plurality of data units for a number that is set in advance, allocating output destinations of a plurality of identical copied data units to different data unit processors, for each combination of at least two data unit processors that is set in advance, obtaining a number of the copied data unit groups in which the identical copied data units are respectively allocated to the data unit processors made into a combination, and respectively allocating the output destinations of the plurality of copied data units to the data unit processors, so that the degree of variation of the number of copied data unit groups obtained for each combination of the data unit processors becomes smaller.

(Supplemental Note 9)

An information processing method according to claim 8, further includes, respectively allocating the output destinations of the plurality of copied data units to the data unit processors, so that the degree of variation of the number of copied data units allocated for each data unit processor becomes smaller.

(Supplemental Note 10)

A program for causing an information processing apparatus to realize data unit output control means for outputting, to a plurality of data unit processors, copied data units obtained by respectively copying a plurality of data units for a number that is set in advance, wherein the data unit output control means respectively allocates output destinations of a plurality of identical copied data units to different data unit processors, and for each combination of at least two data unit processors that is set in advance, the data unit output control means obtains a number of the copied data unit groups in which the identical copied data units are respectively allocated to the data unit processors made into a combination, and the data unit output control means respectively allocates the output destinations of the plurality of copied data units to the data unit processors, so that the degree of variation of the number of copied data unit groups obtained for each combination of the data unit processors becomes smaller.

It should be noted that the programs described in each of the above exemplary embodiments and Supplemental notes are stored in a storage device, or recorded in a computer-readable recording medium. For example, the recording medium is a medium having portability such as a flexible disk, an optical disk, a magneto-optical disk, a semiconductor memory, and the like.

The invention of the present application has been hereinabove explained with reference to each of the above exemplary embodiments, but the invention of the present application is not limited to the exemplary embodiments described above. Various changes that can be understood by a person skilled in the art within the scope of the invention of the present application can be made in the configuration and the details of the invention of the present application.

It should be noted that the present invention enjoys the benefits of the priority claim based on the patent application of Japanese Patent Application No. 2013-027312 filed on Feb. 15, 2013, in Japan, and all the contents described in the patent application is deemed to be included in this Description.

REFERENCE SIGNS LIST

1 distributed processing system
11 information processing apparatus
12 job client
13 system management client
21 work unit management module
22 task management module
23 task collector
24 data arrangement management module
25 work unit module
31 work unit storage
41 job receiver
42 task generator
43 task scheduler
44 job storage
45 task storage
51 task result receiver
52 job result output module
61 data arrangement planning module
62 data arrangement execution module
63 master data storage
64 data arrangement storage
71 task request module
72 task execution module
73 copied data storage
201 distributed processing system
211 data unit output controller
212 data unit processor

What is claimed is:

1. An information processing apparatus for improving throughput, the information processing apparatus comprising:

a plurality of work unit processors;

a data unit output controller configured to output, to the plurality of work unit processors, copied data units obtained by respectively copying a plurality of data units for a number that is set in advance; and a processing request controller, implemented by at least one processor, configured to obtain a processing request for the plurality of data units, and generate a divided processing request dividing the obtained processing request in association with each of the plurality of data units, wherein the data unit output controller comprises:

a memory configured to store instructions; and at least one processor configured to process the instructions to:

respectively allocate output destinations of a plurality of identical copied data units to different work unit processors, for each combination of at least two work unit processors that is set in advance, obtain a number of copied data unit groups in which the identical copied data units are respectively allocated to the work unit processors made into a combination, calculate a standard deviation, with respect to a predetermined reference value, of the number of copied data unit groups allocated with the identical copied data units obtained for each combination of the work unit processors, and respectively allocate the output destinations of the plurality of copied data units to the work unit processors in such a way that the standard deviation of the number of copied data unit groups thus calculated becomes a minimum, and wherein the processing request controller obtains identification information for identifying the copied data unit allocated to the work unit processor from the work unit processor, and the processing request controller is configured to output, to the work unit processor, the divided processing request corresponding to the copied data unit identified by the obtained identification information.

2. The information processing apparatus according to claim 1, wherein
the at least one processor is further configured to process the instructions to allocate the output destinations of the plurality of copied data units to the work unit processors in such a way that a total summation of the number of copied data unit groups obtained for each combination of the work unit processors is minimized.

3. The information processing apparatus according to claim 1, wherein
the at least one processor is further configured to process the instructions to generate a data unit output table in which the work unit processor serving as the output destination and the copied data unit allocated to the work unit processor are associated with each other, and output the plurality of copied data units to the plurality of work unit processors using the generated data unit output table.

4. The information processing apparatus according to claim 1,
wherein the processing request controller is further configured to output divided processing requests to the work unit processor,
the divided processing requests having not yet output to another work unit processor chosen from among the divided processing requests corresponding to the copied data unit identified by the obtained identification information, wherein a number of the divided processing requests is equal to or less than an average value, which is obtained by calculating a total summation of the numbers of copied data units allocated to the work unit processors and dividing the calculated total summation by the number of work unit processors.

5. An information processing method for improving throughput, the method comprising:
outputting, to a plurality of work unit processors, copied data units obtained by respectively copying a plurality of data units for a number that is set in advance,
obtaining a processing request for the plurality of data units, and generating a divided processing request dividing the obtained processing request in association with each of the plurality of data units,
allocating output destinations of a plurality of identical copied data units to different work unit processors,
for each combination of at least two work unit processors that is set in advance, obtaining a number of copied data unit groups in which the identical copied data units are respectively allocated to the work unit processors made into a combination,
calculating a standard deviation, with respect to a predetermined reference value, of the number of copied data unit groups allocated with the identical copied data units obtained for each combination of the work unit processors, and respectively allocating the output destinations of the plurality of copied data units to the work unit processors in such a way that the standard deviation of the number of copied data unit groups thus calculated becomes a minimum, and
obtaining identification information for identifying the copied data unit allocated to the work unit processor from the work unit processor, and outputting, to the work unit processor, the divided processing request corresponding to the copied data unit identified by the obtained identification information.

6. A non-transitory computer readable medium storing a program for improving throughput, the program causing a computer to execute steps comprising:
outputting, to a plurality of work unit processors, copied data units obtained by respectively copying a plurality of data units for a number that is set in advance,
obtaining a processing request for the plurality of data units, and generating a divided processing request dividing the obtained processing request in association with each of the plurality of data units,
respectively allocating output destinations of a plurality of identical copied data units to different work unit processors,
for each combination of at least two work unit processors that is set in advance, obtaining a number of copied data unit groups in which the identical copied data units are respectively allocated to the work unit processors made into a combination,
calculating a standard deviation, with respect to a predetermined reference value, of the number of copied data unit groups allocated with the identical copied data units obtained for each combination of the work unit processors, and respectively allocating the output destinations of the plurality of copied data units to the work unit processors in such a way that the standard deviation of the number of copied data unit groups thus calculated becomes a minimum, and
obtaining identification information for identifying the copied data unit allocated to the work unit processor from the work unit processor, and outputting, to the work unit processor, the divided processing request corresponding to the copied data unit identified by the obtained identification information.

* * * * *